(12) United States Patent
Phillips et al.

(10) Patent No.: US 6,610,810 B2
(45) Date of Patent: Aug. 26, 2003

(54) BIOPOLYMERS OBTAINED BY SOLID STATE IRRADIATION IN AN UNSATURATED GASEOUS ATMOSPHERE

(76) Inventors: Glyn Owen Phillips, 2 Plymouth Drive Radyr, Cardiff, Wales (GB), CF 15 8BC; Tjaart Andries Du Plessis, P.O. Box 11303, Hatfield, 298 Stokkiesdraai, Erasmusrad, Pretoria (ZA), 0029; Saphwan Al-Assaf, The North East Wales Institute, Plaś Coch, Mold Road, Wrexham, Wales (GB), LLi 3AW; Peter Anthony Williams, 24 Parc Gorsedd, Gorsedd, Holywell, Flintshire, Wales (GB), CH8 8RP ( * ) Notice: Subject to any disclaimer, the term of this patent is extended or adjusted under 35 U.S.C. 154(b) by 134 days.

(21) Appl. No.: 09/805,385

(22) Filed: Mar. 13, 2001

(65) Prior Publication Data

US 2003/0027883 A1 Feb. 6, 2003

(51) Int. Cl.$^7$ .............. C08G 63/00; C08H 5/02; C08F 2/46
(52) U.S. Cl. .......... 527/201; 527/300; 527/313; 527/400; 522/87; 522/88; 522/89
(58) Field of Search ............... 527/201, 300, 527/313, 400; 522/87, 88, 89

(56) References Cited

U.S. PATENT DOCUMENTS

| | | | | |
|---|---|---|---|---|
| 3,170,892 A | * | 2/1965 | Busse | 500/125 |
| 3,236,584 A | * | 2/1966 | Degering | 8/116.1 |
| 3,976,552 A | * | 8/1976 | Fanta et al. | 522/89 |

* cited by examiner

Primary Examiner—Nathan M. Nutter
(74) Attorney, Agent, or Firm—Galvin & Palmer

(57) ABSTRACT

Disclosed is a method for modifying naturally occuring biocompatible biopolymers of plant and animal origin by subjecting same to ionizing radiation in the presence of a mediating gas, typically acetylene to enable one to selectively enhance and modify one or more of the physiochemical propserties of the starting materials which have a wide range of uses in medicine, food technology and other industrial applications. Notwithstanding the modifications, the biocompatibility of the biopolymer remains unchanged and no new or additional functional groups are introduced into the starting biopolymer.

53 Claims, 25 Drawing Sheets

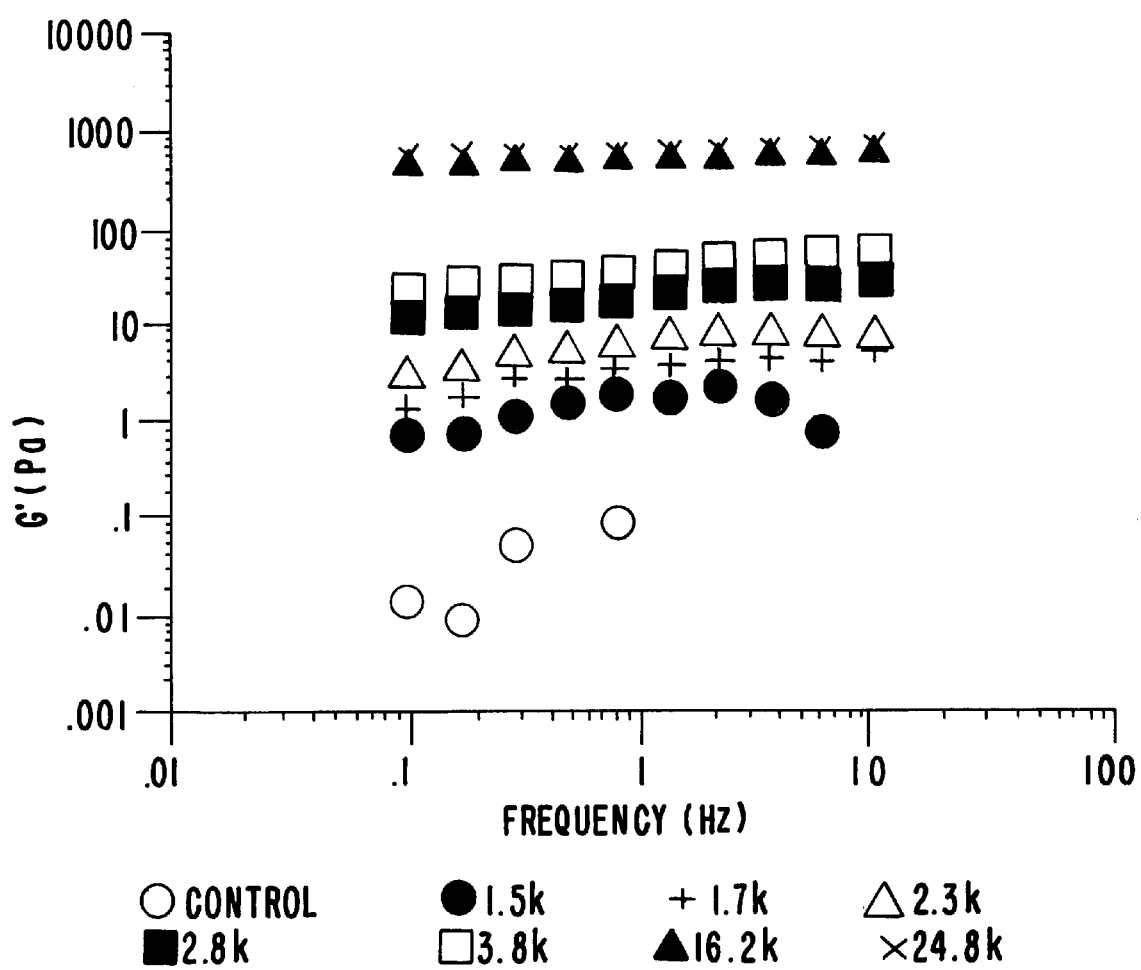

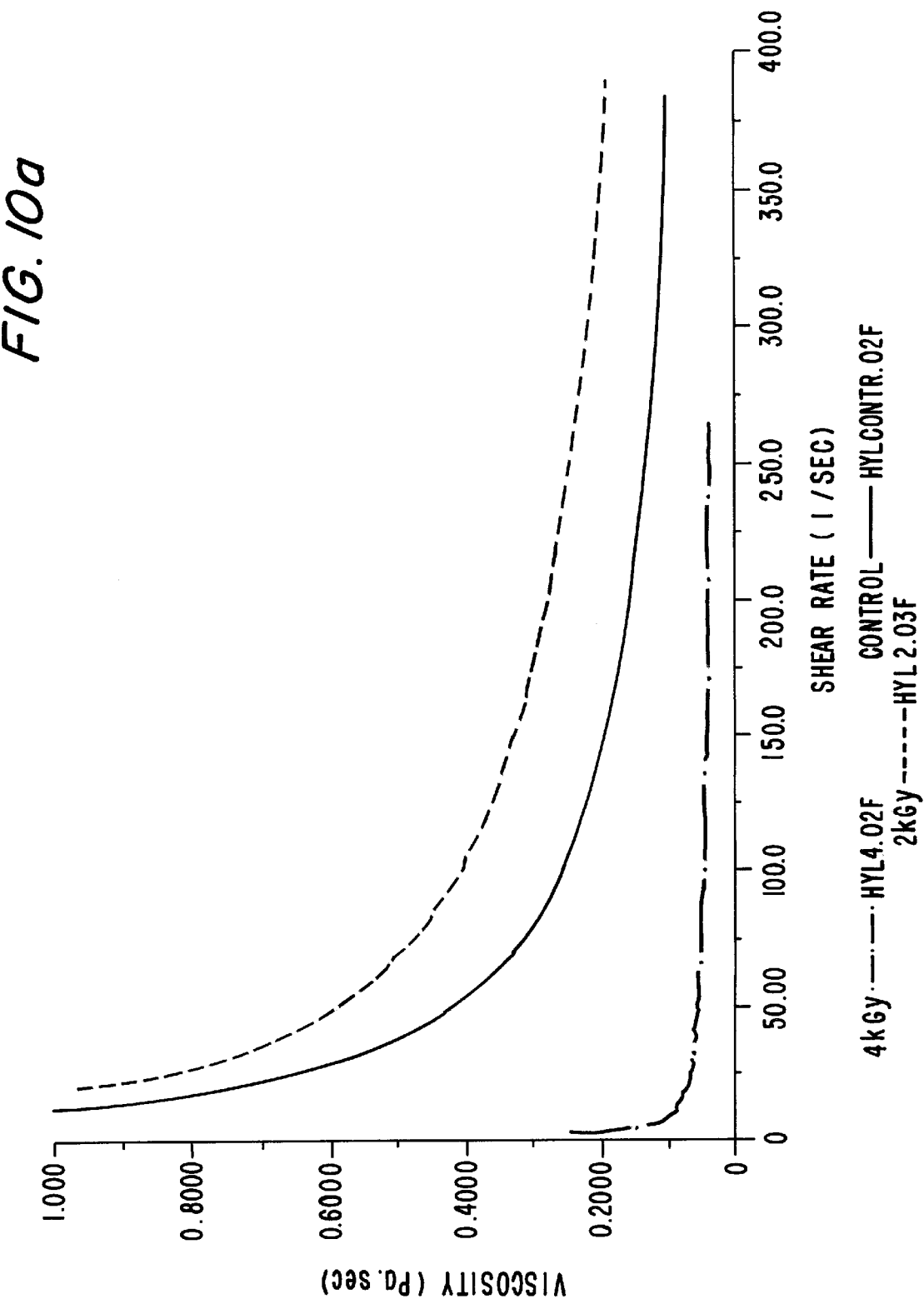

BIOPOLYMERS OBTAINED BY SOLID STATE IRRADIATION IN AN UNSATURATED GASEOUS ATMOSPHERE

BACKGROUND OF THE INVENTION

1. Field of the Invention

The invention relates to a range of new products; processes for preparing them from dry biological polymers (biopolymers) using ionizing radiation in the solid-non fluid state in the presence of an unsaturated gas under specified reaction conditions and the uses thereof.

2. The Prior Art

It is known in the art to subject certain types of polymeric materials to irradiation in order to achieve a number of different goals, although to our knowledge it is not known in the art to subject such biopolymers to high energy irradiation in the presence of a mediating gas, e.g., acetylene, in order to modify the biopolymer so as to enhance its properties in one or more respects. The following U.S. Pat. No. 3,215,634 (Walker); U.S. Pat. No. 4,024,073 (Shimizu); U.S. Pat. No. 4,716,224 (Sakurai); U.S. Pat. No. 4,746,514 (Warne); U.S. Pat. No. 4,987,222; (De Ambrosi); and U.S. Pat. No. 5,376,692 (Park); and published foreign application WO 96/03147; (Fidia, S.p.A) are of interest, but are not significantly relevant. For example, none of the art teaches irradiation of polymeric materials in the solid state, including Warne ('514) who does use an ethylenically unsaturated compound.application WO 96/03147; (Fidia, S.p.A) are somewhat, but not significantly relevant, which is not a gas.

Sakurai ('224) teaches the cross-linking of hyaluronic acid with polyfunctional epoxy compounds under certain conditions, none of which teach the use of ionizing radiation/unsaturated [alkenic or alkynic] gases.

Walker ('634) and Shimizu ('073) also disclose the use of various chemical cross-linking agents for preparing cross-linked polysaccharide products.

De Ambrosi ('222) discloses the controlled preparation of low molecular weight glucosaminoglycans by depolymerizing high molecular weight glucosaminoglycans using γ radiation.

Warne ('514) teaches away from the invention. Warne discloses the preparation of cross-linked hydrogels by subjecting a polysaccharide, specifically, nothing of higher molecular weight than a pentasaccharide, to ionizing radiation in the presence of an ethylenically unsaturated compound (but not a gas) having at least one hydrophilic group.

Park ('692) discloses proteins, e.g., albumin, that are functionalized so that when the albumin is bonded to a blood compatible substrate, and after treatment with radiation, free radicals formed on both the protein and the substrate chemically bind to one another. This reference does not teach or suggest cross-linking the polymers by using ionizing radiation in the presence of an unsaturated gas which forms part of the cross-link.

Fidia (PCT application no. WO 96/03147) teaches the synthesis of chemical gels from polyelectrolyte polysaccharides, including HA and HA-benzyl ester by γ-irradiation, preceded by functionalizing to introduce olefinic bonds, into the structure thereof. The only functionalizing agent disclosed is glycidyl acrylate. Other, less relevant foreign patents such as EP 000 038 426; JP 360,143,991; JP 363,301,234; JP 401,118,529; DE 004,123,889; DE 004,124,338; and JP 406,073,102 are noted.

Non-patent literature relating to the subject matter of this invention, particularly, certain studies conducted on some of the starting materials used herein and the effect of ionizing radiations on uncharged polysaccharides (such as starch and cellulose) and on polyelectrolyte polysaccharides (such as hyaluronic acid and its cross-linked derivative hylan, alginates, heparin etc) is to induce degradation, with main chain scission leading to a decrease in molecular weight and viscosity are discussed in:

The effect of sterilizing doses of γ-irradiation on the molecular weight and emulsification properties of gum arabic; Blake, et al, Food Hydrocolloids 1988, Vol.2 No.5, p.407–415; The effects of radiation on carbohydrates (Phillips, G., Chapter 26 pages 1217–1297 in "The Carbohydrates", second edition. (Eds. Ward Pigman/Derek Horton), Academic Press Inc. New York, 1980); Free radical formation and degradation of cellulose by ionizing radiations. (Nakamura et al. Polymer Photochemistry, 1985, 6, 135–159); Photochemistry and radiation chemistry of cellulose (Phillips et al. Cellulose Chemistry and Its Applications 1985, 290–311); Radiation effects on the biological activity and molecular weight parameters of heparin. (Edwards et al. Carbohydrate Polymers, 1985, 5, 473–478); The radiation-induced degradation of hyaluronic acid. (Deeble et al. Radiat. Phys. Chem. 1991, Vol.37, No.1, 115–118); Susceptibility of Connective Tissue: Biomaterials to Radiation. (Phillips et al. Journal of Korea Biomaterial Research Institute, Vol. 1, No. 1, August 1991, p.92); The enhanced stability of the cross-linked hylan structure to hydroxyl radicals compared with the uncross-linked hyaluronan. (Al-Assaf et al. Radiat. Phys. Chem. 1995, Vol 46, 207–217); Identification of radicals from hyaluronan (hyaluronic acid) and cross-linked derivatives using electron paramagnetic resonance spectroscopy. (Al-Assaf et al. Carbohydrate Polymers, 1999, Vol.38, 17–22); The role of the proteinaceous component on the emulsifying properties of gum arabic. (Randall et al. Food Hydrocolloids, 1988, 2, No.2, 131–140); Structural and chemical properties of gum arabic. Their practical impact. (Phillips et al. Proceedings Gum Arabic Symposium, ZDS, Solingen, Germany, Jun. 6–8, 1988); The influence of structure and technology on gum arabic functionality. (Phillips, G., Supplement to Food Review February/March, 1988, pp.64–68); Fractionation and characterization of gum from *Acacia senegal*. (Randall et al. Food Hydrocolloids, 1989, Vol.3, No. 1, p.65–75); The molecular characterization of the polysaccharide gum from *Acacia senegal*. (Osman et al. Carbohydrate Research, 1993, 246, pp. 303); The Classification of Natural Gums. Part III. *Acacia senegal* and Related Species (Gum Arabic); (Jurasek et al. Food Hydrocolloids, 1993, Vol.7, No.3, pp. 255–280); Acacia gum (Gum Arabic): a nutritional fibre; metabolism and calorific value. (Phillips, G., Food Additives and Contaminants, 1998, Vol. 15 No.3, 251–264); and. A review of recent developments on the regulatory, structural and functional aspects of gum arabic. (Islam et al. Food Hydrocolloids, 1997, Vol 11 (4), pp 357–365). Fractionation and characterization of gum from *Acacia Senegal*. (Randall et al. Food Hydrocolloids, 1989, Vol.3, pp.65–75) The molecular characterization of the polysaccharide gum from *Acacia senegal*. (Osman et al. Carbohydrate Research, 1993, 246, pp. 303); The Classification of Natural Gums. Part Ill. *Acacia Senegal* and Related Species (Gum Arabic) (Jurasek et al. Food Hydrocolloids, 1993, Vol.7, No.3, pp. 255–280).

SUMMARY OF THE INVENTION

The invention provides an extremely broad category of new biopolymers having dramatically improved properties in comparison with the starting biopolymers. The molecular weights of these materials can be increased in a controlled manner to provide new physical and chemical functionalities (for example emulsification and water binding). Aqueous solutions of the new products can be produced with literally any desired viscosity and/or viscoelasticity. The biopolymers can be converted into new hydrophilic gels (hydrogels) of defined particular size and having specified micromechanical properties. The changes can be accomplished without the introduction of new chemical substituents, and hence, the new materials retain the inherent biocompatibility of the starting, or parent biopolymer. One or more different biopolymers can be used together in the process to yield new bio-copolymers.

As used herein the term biopolymer and biological polymer is understood to mean a polymer derived from a biological source, whether plant, including microorganisms or animal.

The biopolymers contemplated by the invention comprise unsubstituted biopolymers extending over the entire field of plant and animal derived polysaccharides, whether charged or uncharged, as well as proteins directly derived from animal connective tissue sources such as collagen, gelatin, and from human and animal products, such as casein, combinations of one or more such polysaccharides with one or more proteins of plant origin—such as arabinogalactan proteins, biological tissues and materials derived therefrom used for tissue replacement and transplantation, either finished or partially finished and which are made or formed from one or more of such biopolymers or combinations thereof with the other aforesaid materials. The biopolymers to be treated to form the new materials according to the process of the invention do not need to be modified in any way prior to treatment, for example, by introducing any functionalizing groups which might, in other processes be necessary to activate the biopolymer or make it more reactive.

Illustrative examples of the biopolymers contemplated by this invention include: acacia plant exudates, such as *acacia senegal* and *acacia seyal,* representing the arabinogalactan proteins present in all plants; dextran and related bacterial polysaccharides; chemically modified polysaccharides such as carboxymethyl cellulose; gelling polysaccharides from either bacterial origin (xanthan) or plant (carrageenan) or fruit origin (pectin); animal connective tissue polysaccharides and proteins, and combinations thereof, such as hyaluronan, proteoglycans and chemically modified animal derived polysaccharides such as hylan; and interactive combinations of these materials which can be associated, bonded and adhered in specific combinations.

In carrying out the process of the invention for producing the new materials from the starting biopolymers, it is preferred that the biopolymer be in its original solid state, i.e., dry, in an atmosphere comprising a mediating agent, preferably a low molecular weight unsaturated alkenic or alkynic gas such as ethylene, propylene or acetylene, preferably acetylene. Before introducing the mediating gas to the reaction site, the site must be flushed to remove therefrom any active, oxygen containing atmosphere. All the mediating gas is removed after completion of the process and therefore, the resulting new materials do not contain any of the mediating gas.

The biopolymeric system (or the finished or partially finished product made therefrom) from which the active atmosphere has been removed is then saturated with the mediating gas at atmospheric pressure and exposed to a source of ionizing radiation which may be either a radioactive isotope such as $^{60}$Co ($\gamma$-rays) or radiation generated by a high energy (250 KeV to 10 MeV) electron accelerator or X-rays generated by the accelerator or any other suitable device.

The minimum absorbed radiation dose may vary from 1 kGy to 50 kGy, depending on the structure of the biopolymer, whether branched or long-chain nature of the product desired, whether of increased molecular weight to form a readily water soluble product or to form either a gel or a membrane product. As a general guide, highly branched polysaccharide structures can produce a 4-fold increase in molecular weight with doses up to 10 kGy and gels with doses up to 50 kGy, whereas straight chain structures can yield a similar change with doses as low as 1–3 kGy. Proteins require doses up to 25 kGy to achieve a similar result. Blends and combined adhesive systems require careful dose selection according to the composition of the systems Following the irradiation step in the presence of the gaseous mediating agent, and in order to remove any activated species produced by the radiation system, the resulting biopolymer system or new material is subjected to heat treatment (annealing) in the absence of oxygen at elevated temperatures ranging from 40° C. to 120° C. depending on the heat stability of the biopolymer system which is being modified. This annealing step may ideally be carried out in the presence of the unsaturated gaseous atmosphere or, alternatively, in the presence of an inert gas such as nitrogen or helium, or in a vacuum oven. The former can increase the amount of new product formation, and the latter provides a suitable mechanism for termination of the process.

Following the annealing step, any residual gaseous mediating agent is removed from the modified biopolymeric system by aerating the system, and if necessary, the application of a vacuum process to the treated polymer. This will depend on the retention ability of the material for the gas which depends on the porosity of the solid system.

The resulting new biopolymers obtained by the above-described treatment are characterized by changes in the following parameters when comparing the starting material with the new biopolymers:

a) molecular weight can be increased 4–5 fold;
b) increased water binding usually parallels that of the increase in molecular weight;
c) emulsion with droplet sizes of the order 1 $\mu$m can be achieved using reduced concentrations of the biopolymers;
d) a range of changes in viscosity and viscoelasticity of up to 1000 fold; and
e) there is observed formation of hydrogels having particle sizes from 150–2000 $\mu$m.

The molecular weight of the starting biopolymer can be increased in a controlled manner to provide a new generation of products with enhanced properties without losing the basic functionalities of the parent biopolymer. The increased molecular parameters allow greater water binding, improved physical functionalities, such as lower emulsion droplet formation, new binding capabilities and functions to other polymers, whether charged or uncharged, and better fabrication qualities for drug and small ion release.

Water soluble products of increased or decreased viscosity and/or viscoelasticity can be produced. Thus, new food, industrial and medical products can be produced.

Of singular significance to this invention is the fact that no significant or identifiable chemical changes are introduced into the structure of the biopolymer as a result of the process. Thus, any new product made according to the invention will be used in practice in substantially the same way as the parent biopolymer.

Hydrophilic gels (hydrogels) can be produced of a defined particle size and specified micro-mechanical properties.

The products are as biocompatible as are the parent biopolymers.

A wide range of new products can be obtained by changes in the process parameters and these are an integral part of the spirit and purpose of the present invention, and are included within the scope of the claims made herein. The process does not yield a single new product, or even a series of new products within a particular type of biopolymer, but rather, it offers the opportunity of producing a family of new products, each of which may be tailor made for specific applications.

BRIEF DESCRIPTION OF THE DRAWINGS

The drawings in this application comprise FIGS. 1 through 22c, a total of 41 figures on 25 sheets. Each of the figures listed and described below are graphs and are referred to in one or more of the Examples in the section entitled Detailed Description of the Invention.

There follows a list of each of the drawings with a description of what they show.

| GSDA-C | control | GSD2-3K | 2.3 kGy |
| GSD3-8K | 3.8 kGy | GSD6-1K | 6.1 kGy |
| GSD10-5K | 10.5 kGy | GSD13-9K | 13.9 kGy |
| GSD25A2 | 24.8 kGy | GSD50A 1 | 49.8 kGy |

Figure 2A:
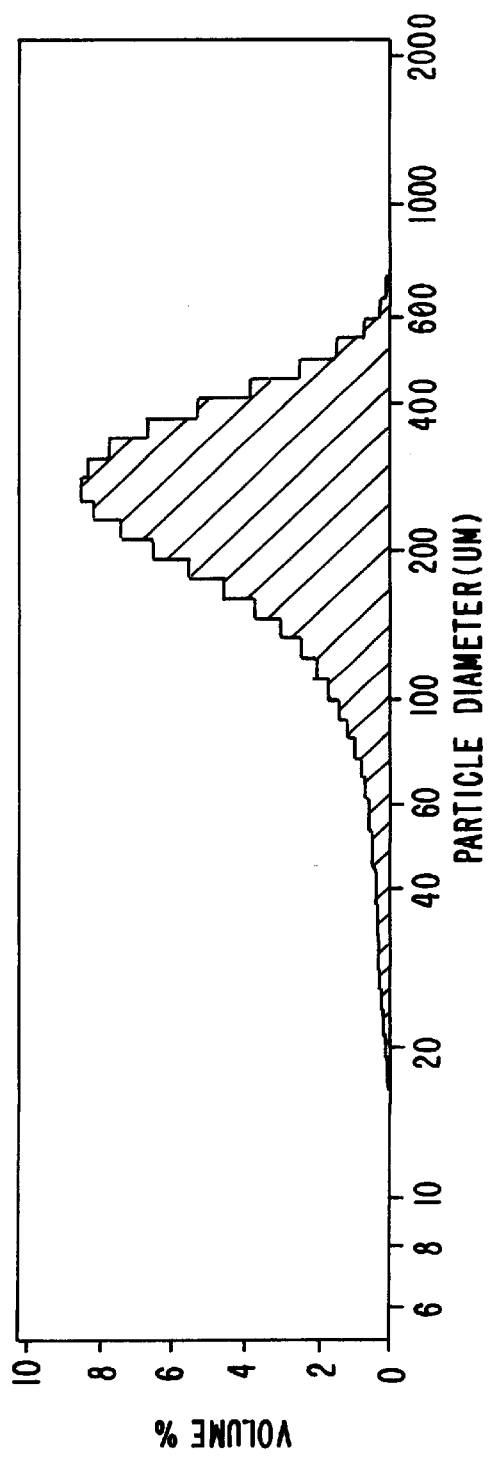
Figure 2B:
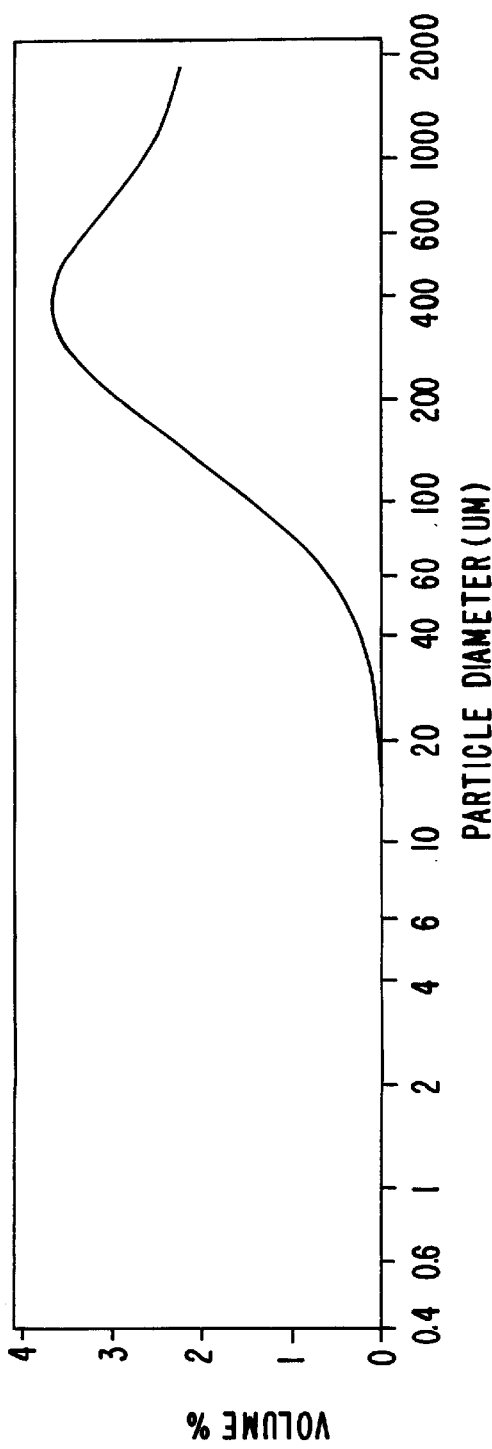

FIG. 2 Enhanced production of hydrogels under varying processing conditions.

Figure 3:
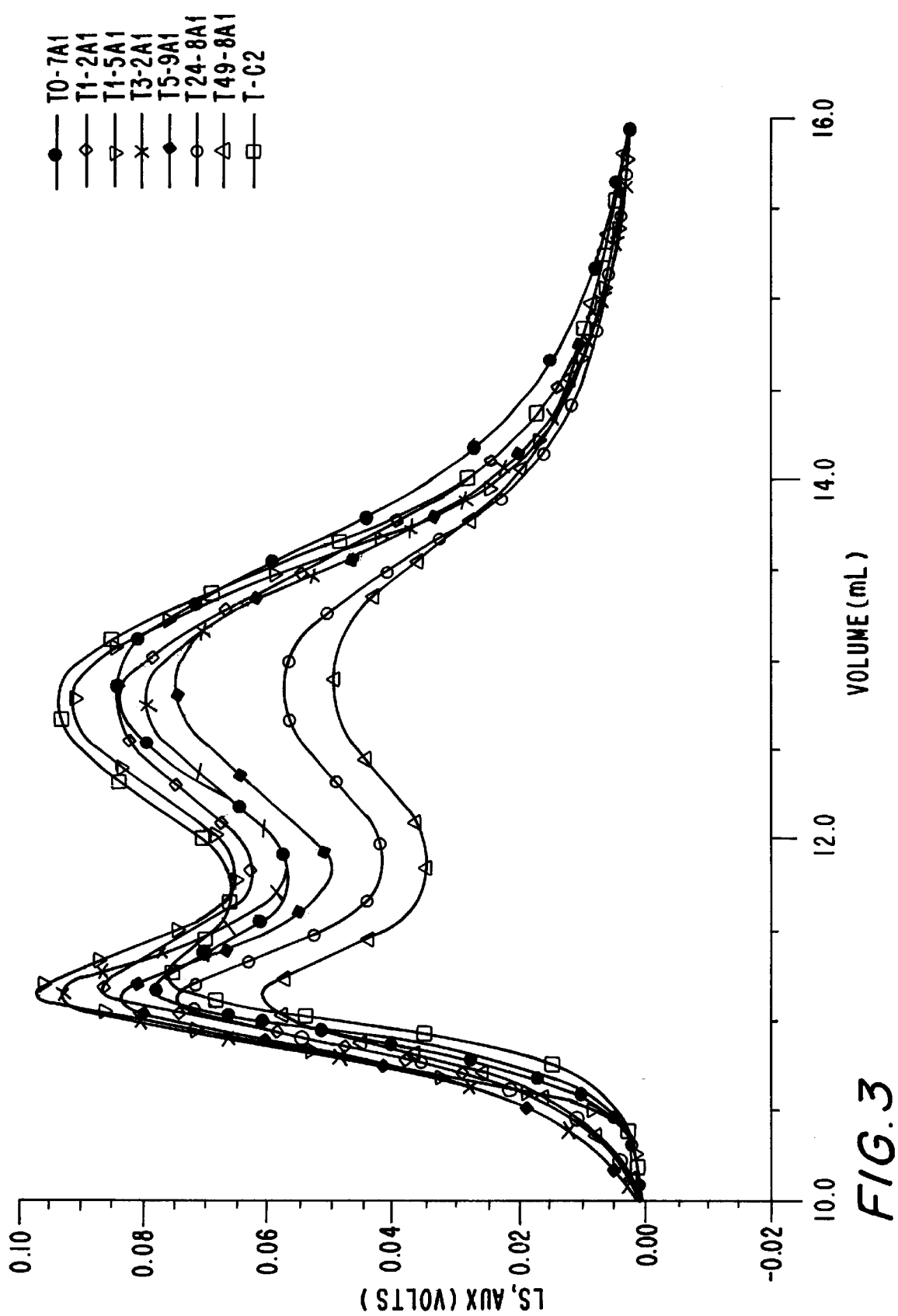

FIG. 3 A comparison of *Acacia Seyal* protein content when subjected to radiation processing; monitored by ultra-violet absorption at 214 nm.

| T0-7A1 | 0.7 kGy | T1-2AI | 1.2 kGy |
| TI-5A1 | 1.5 kGy | T3-2A1 | 3.2 kGy |
| T8-9A1 | 5.9 kGy | T24-8A1 | 248 kGy |
| T49-8A1 | 49.8 kGy | T-C2 | Control |

Figure 4A:
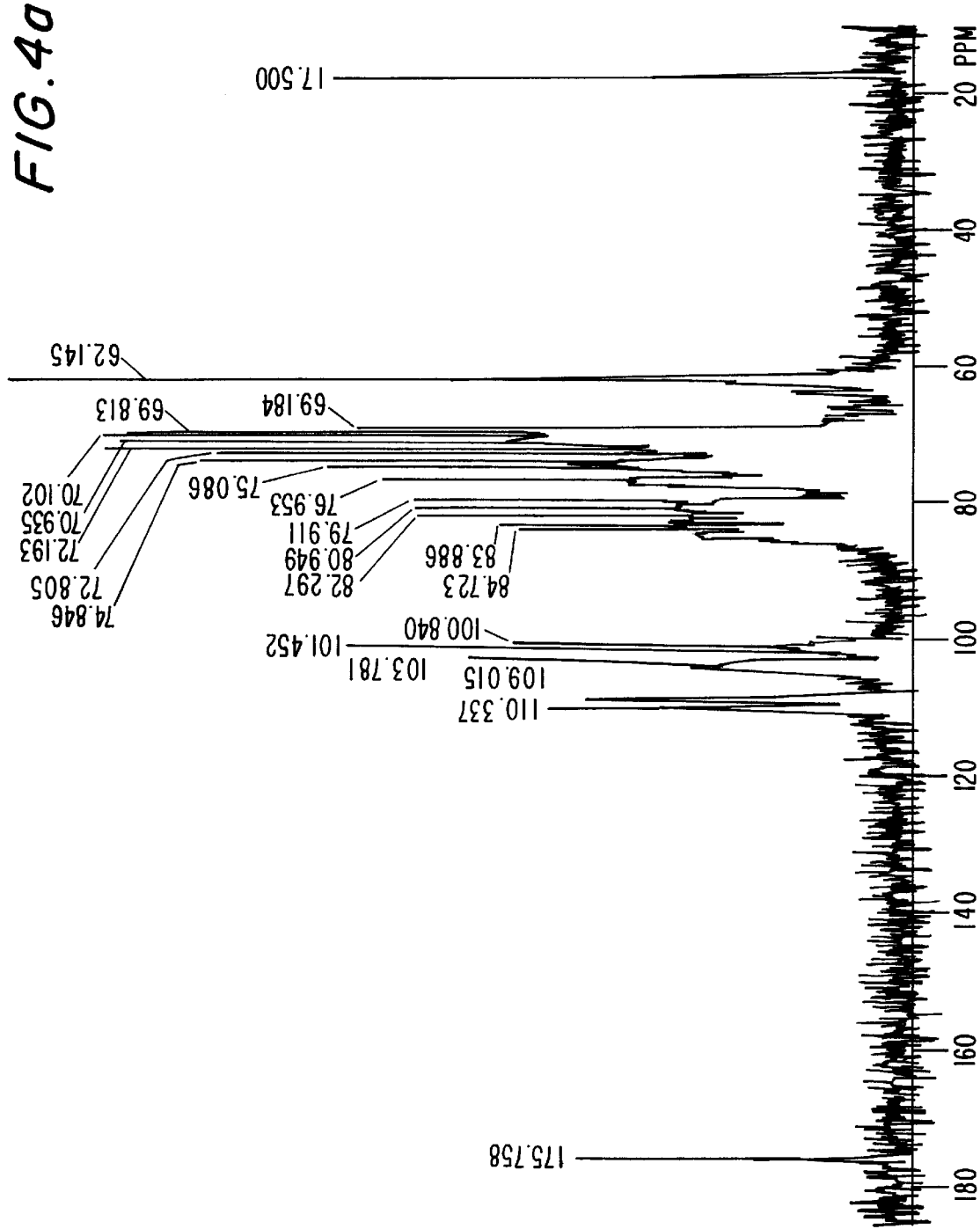

FIG. 4a $^{13}$C-NMR of *Acacia senegal* (unirradiated).

Figure 4B:
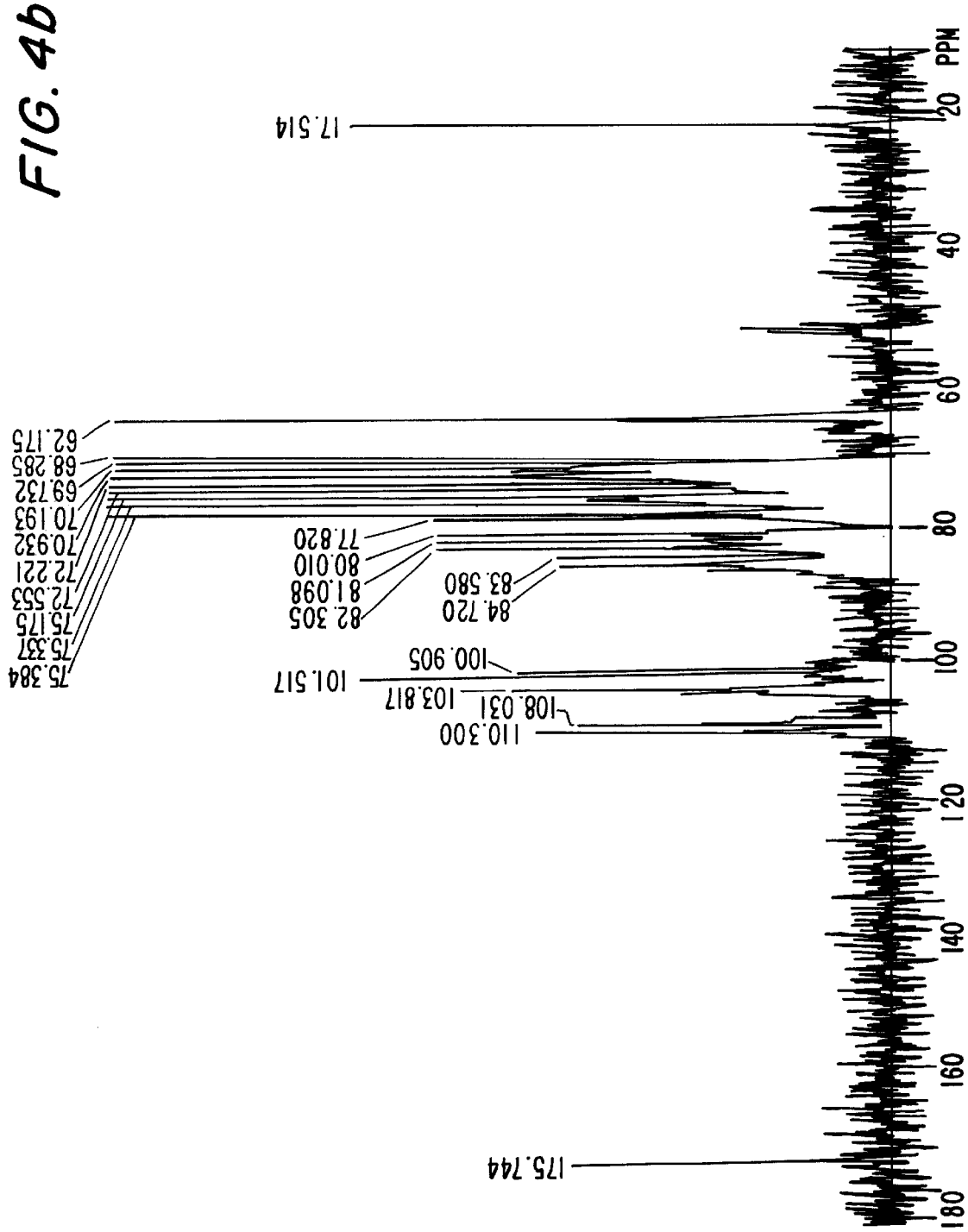

FIG. 4b $^{13}$C-NMR of *Acacia senegal* (irradiated for 6.1 kGy)

Figure 5:
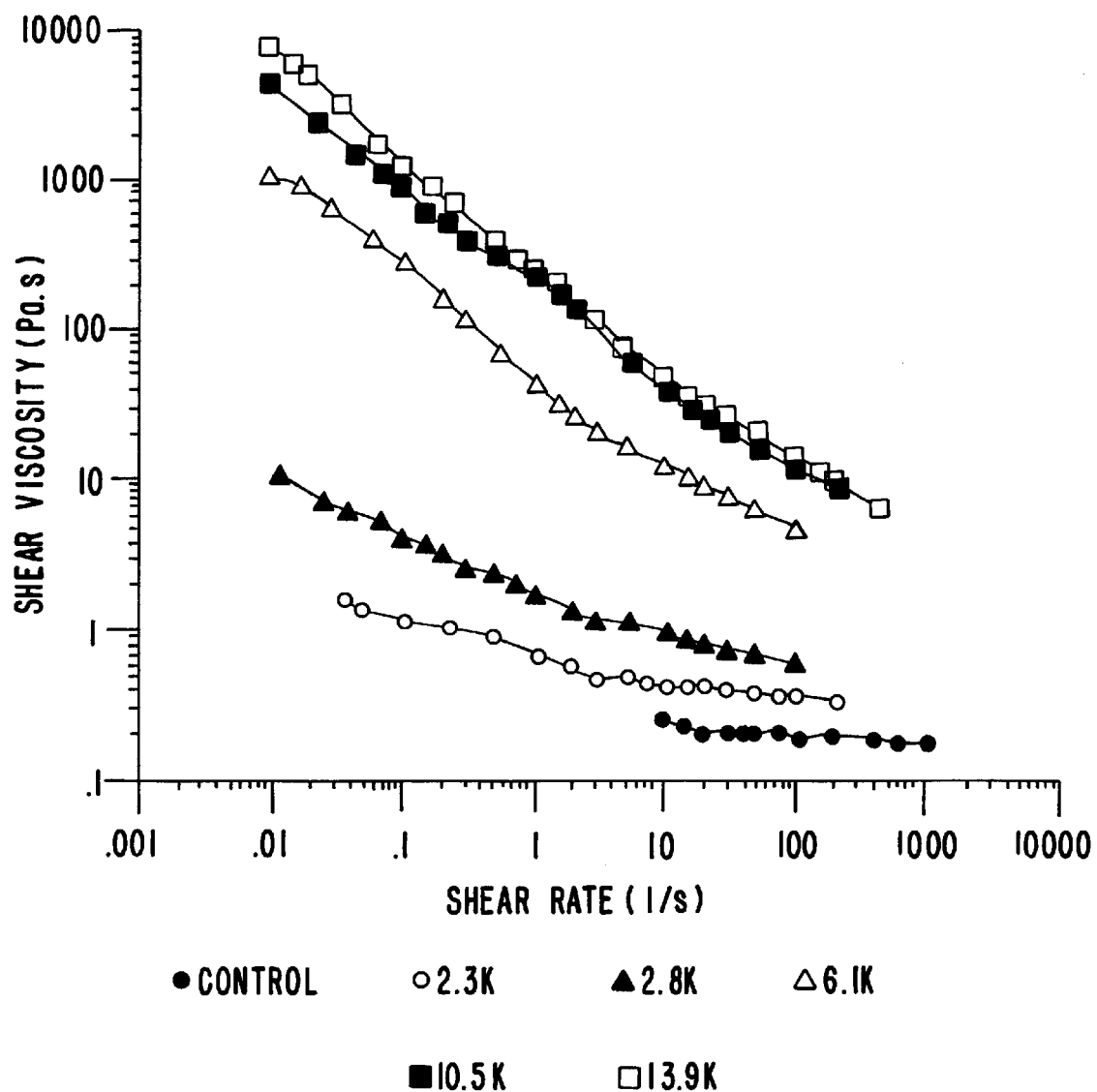

FIG. 5 Shear viscosity profile as a function of shear rates of 33.3% (w/w) control and irradiated *Acacia Senegal* (spray dried). (●) control; (○) 2.3 kGy; (▲) 2.8 kGy; (△)6.1 kGy; (■) 10.5 kGy; (□) 13.9 kGy.

FIG. 6 A plot of (a) storage modulus and (b) loss modulus as a function of frequency of 33.3% (w/w) control and irradiated *Acacia Senegal* (spray dried). (▲) control; (□) 2.3 kGy; (●) 2.8 kGy; (x) 3.8 kGy; (◊) 6.1 kGy; (■) 10.5 kGy; (□) 13.9 kGy.

Figure 7A:
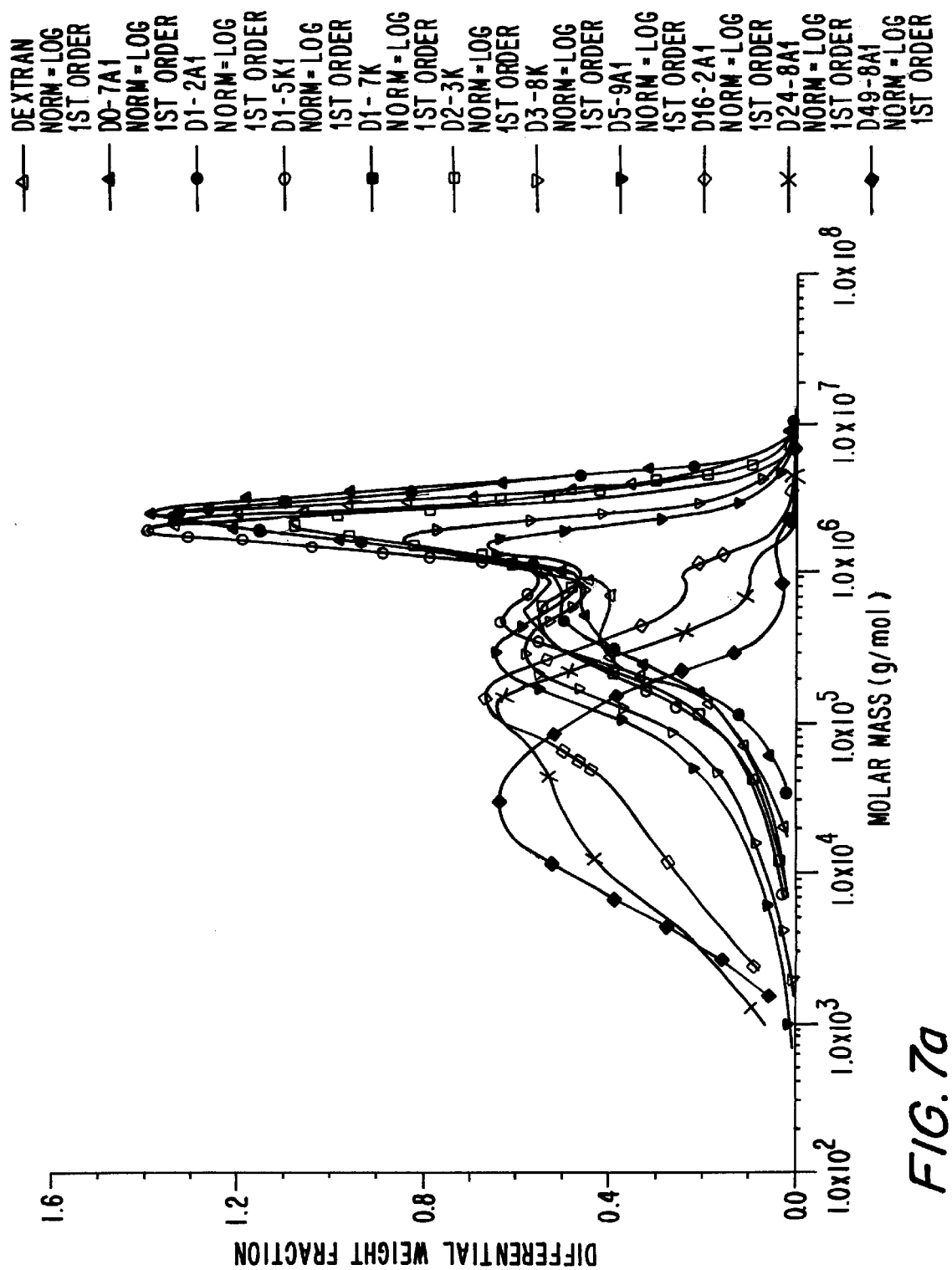

FIG. 7a Differential molar mass distribution of control and irradiated Dextran.

| Dextran | Control | D0-7A1 | 0.7 kGy |
| D1-2A1 | 1.2 kGy | D1-5K1 | 1.5 kGy |
| D1-7K | 1.7 kGy | D2-3 kGy | 2.3 kGy |
| D3-8K | 3.8 kGy | D5-9A1 | 5.9 kGy |
| D16-2A1 | 16.2 kGy | D24-8A1 | 24.8 kGy |
| D49-8A1 | 49.8 kGy | | |

FIG. 7b Storage modules (G') plotted as a function of frequency of 6.25% (w/v) Dextran. (○) control; (○) 1.5 kGy; (+) 1.7 kGy; (△) 2.3 kGy; (■) 2.8 kGy; (□) 3.8 kGy; (▲) 16.2 kGy; (x) 24.8 kGy.

Figure 8A:
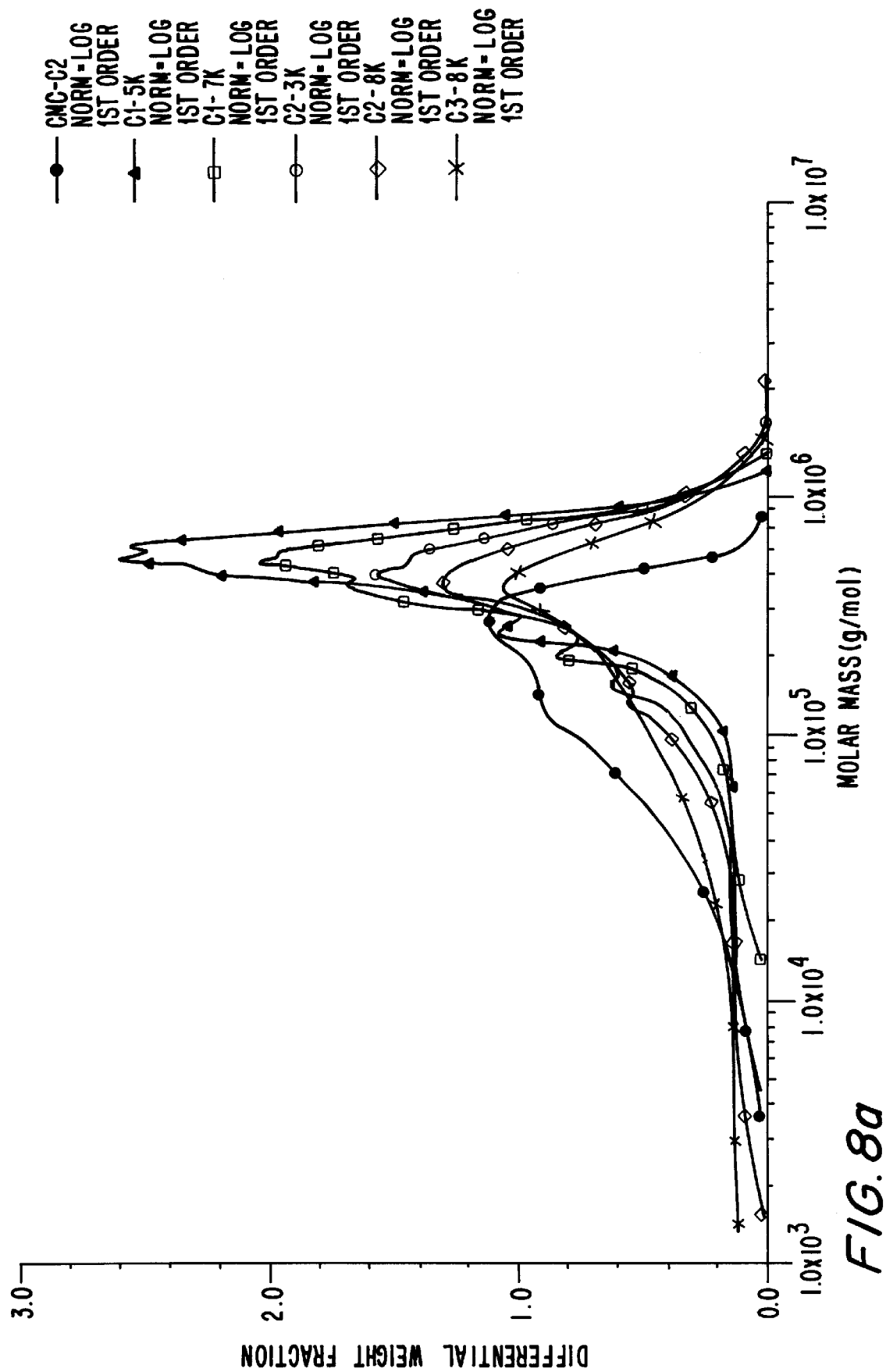

FIG. 8a Differential molar mass distribution of control and irradiated CMC.

| CMC-C2 | Control | C1-5K | 1.5 kGy |
| C1-7K | 1.7 kGy | C2-3K | 2.3 kGy |
| C2-8K | 2.8 kGy | C3-8K | 8.3 kGy |

Figure 8B:
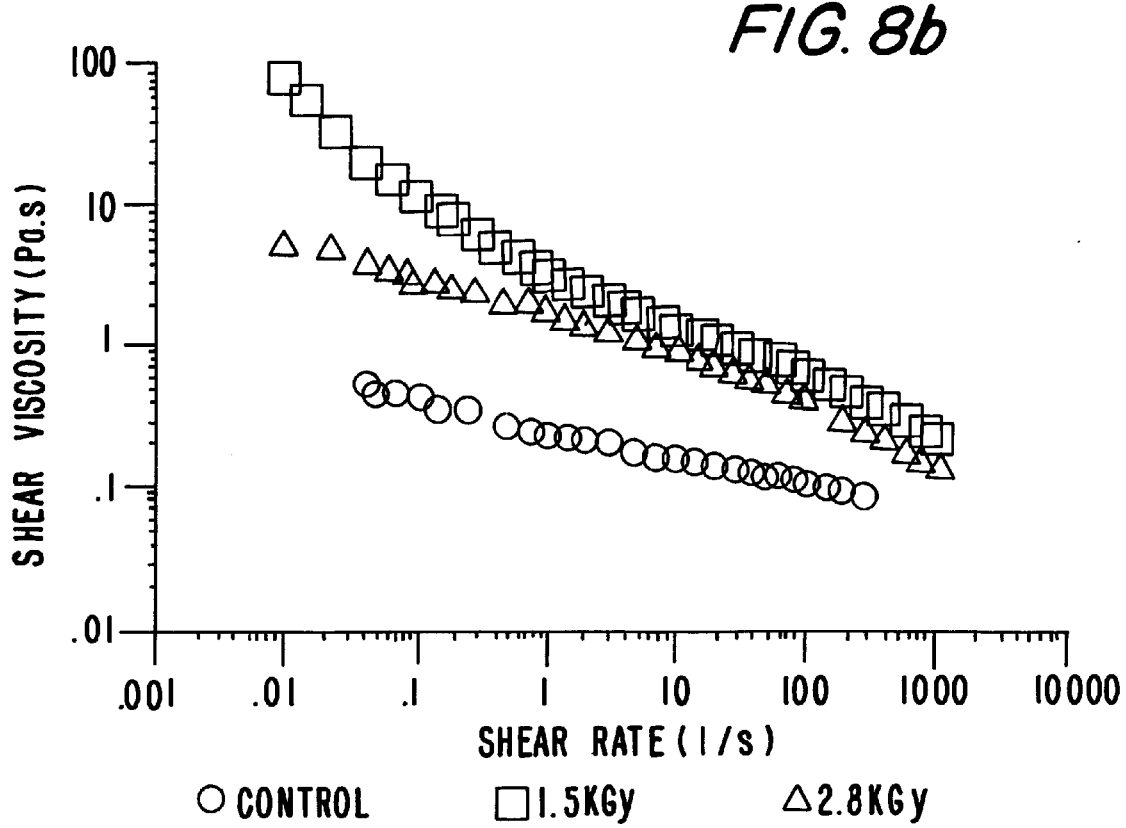

FIG. 8b Shear viscosity profile as a function of shear rates of control and irradiated 2% in $H_2O$ of CMC. (○) control; (△) 1.5 kGy; (□) 2.8 kGy.

Figure 8C:
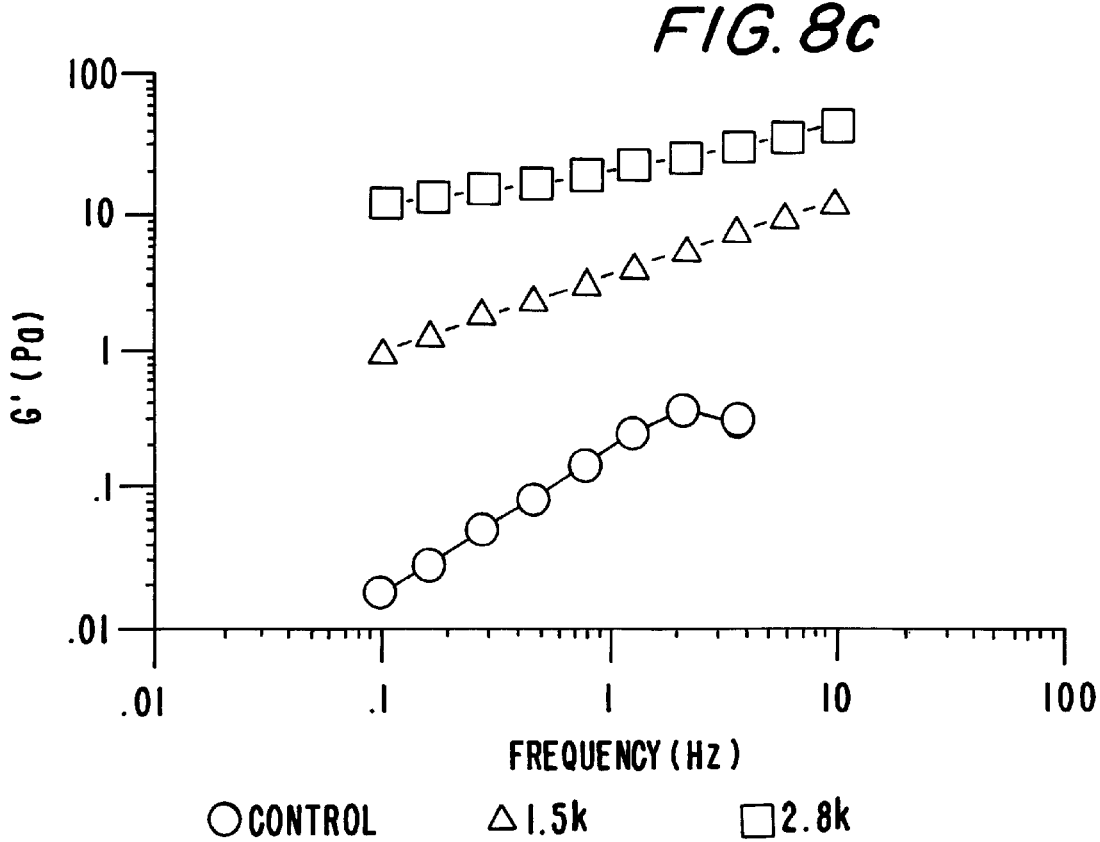

FIG. 8c Storage modulus (G'); plotted as a function of frequency for 2% in $H_2O$ of control and irradiated CMC (○) control; (△) 1.5 kGy; (□) 2.8 kGy.

Figure 9A:
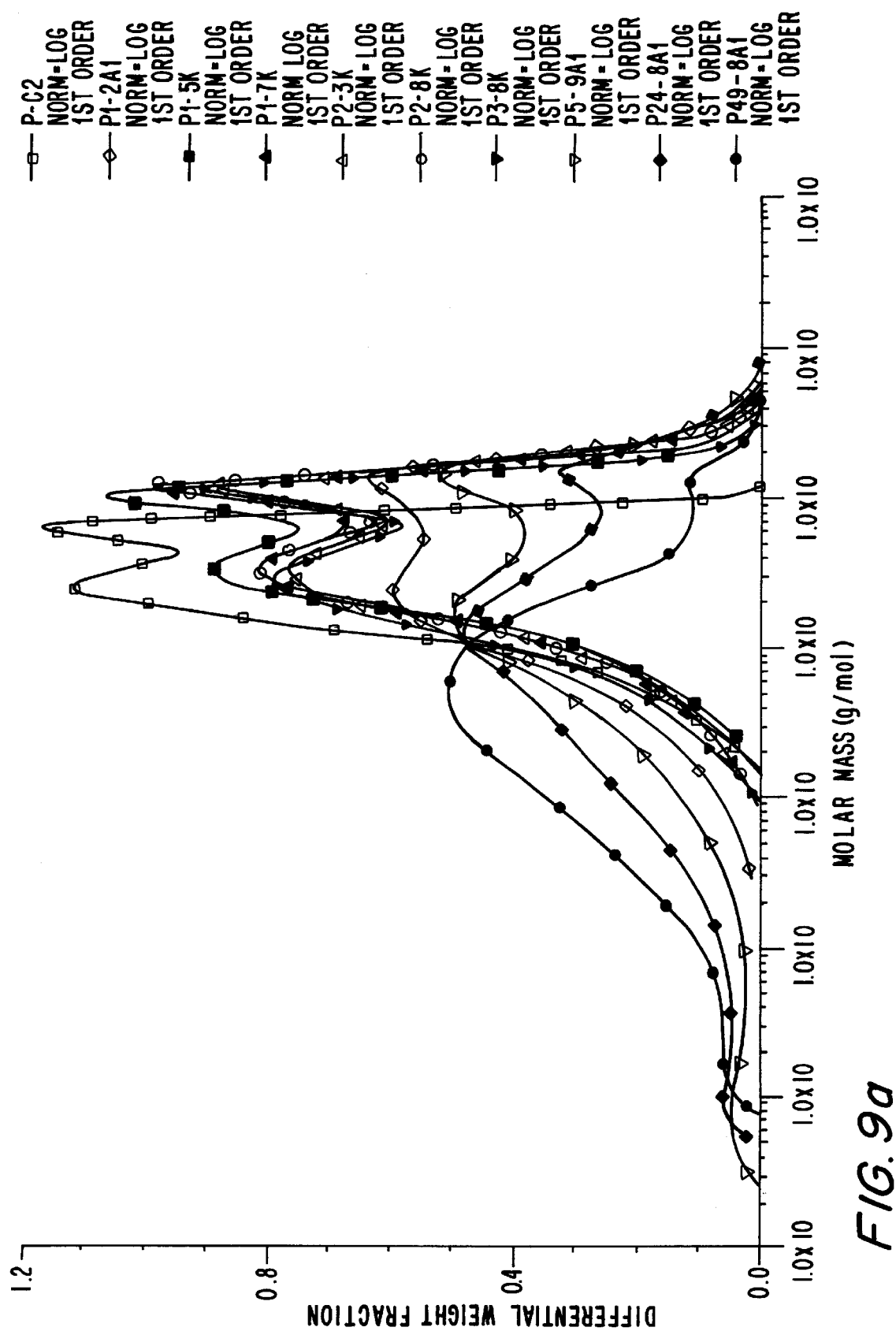

FIG. 9a Differential molar mass distribution of control and irradiated pullulan

| P-C2 | Control | P1-2AI | 1.2 kGy |
| P1-5K | 1.5 kGy | P1-7K | 1.7 kGy |
| P2-3K | 2.3 kGy | P2-8K | 2.8 kGy |
| P3-8K | 3.8 kGy | P5-9A1 | 5.9 kGy |
| P24-8A1 | 24.8 kGy | P49-8A1 | 49.8 kGy |

Figure 9B:
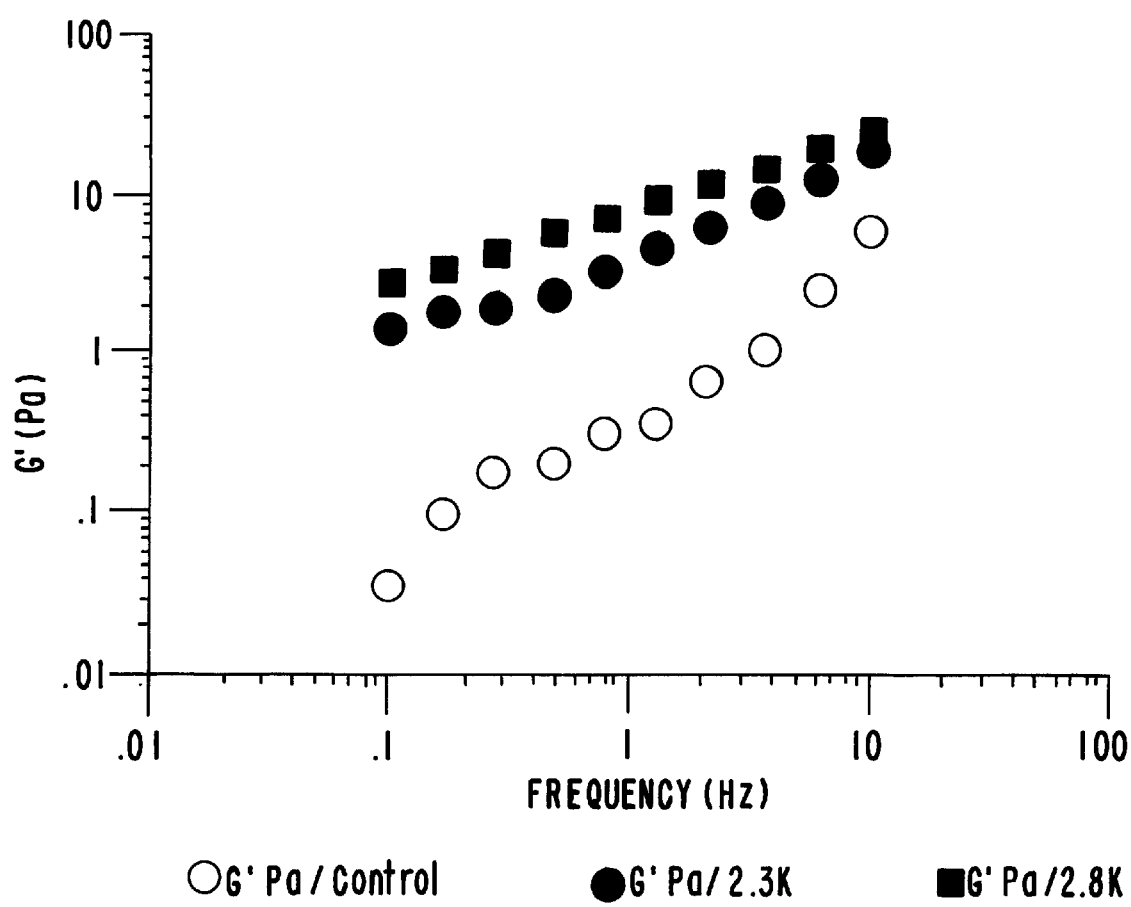

FIG. 9b Storage modulus (G'); plotted as a function of frequency of control and irradiated 20% pullulan. (○) control; (●) 2.3 kGy; (■) 2.8 kGy.

FIG. 10a Shear viscosity as a function of shear rates for 0.5% in $H_2O$ of irradiated hyaluronan compared with control.

Figure 10B:
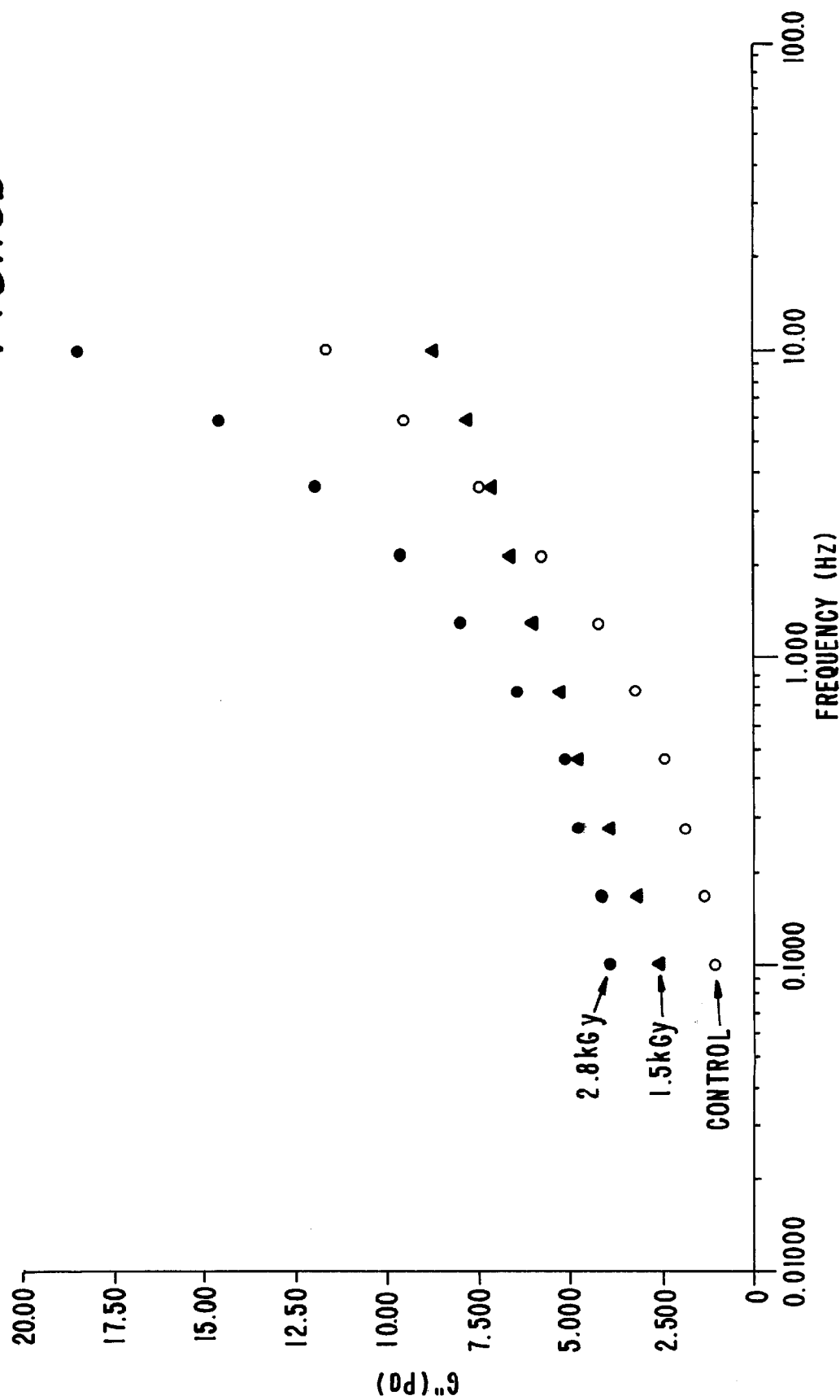

FIG. 10b Loss modulus (G") plotted as a function of frequency for 0.4% in $H_2O$ of irradiated hyaluronan compared with the control.

Figure 10C:
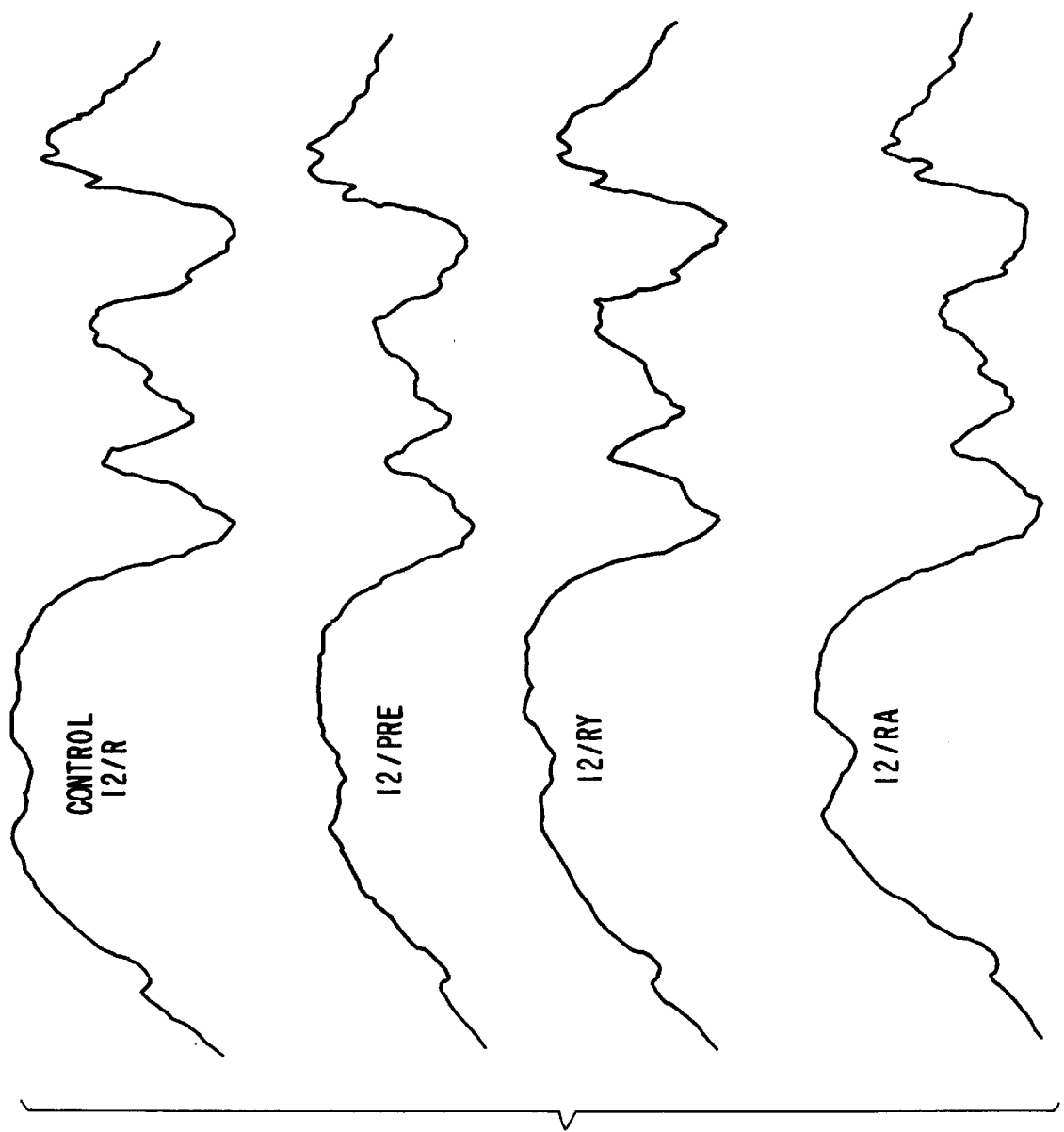

FIG. 10c Infra red scans of irradiated hylan fibers.

Figure 11A:
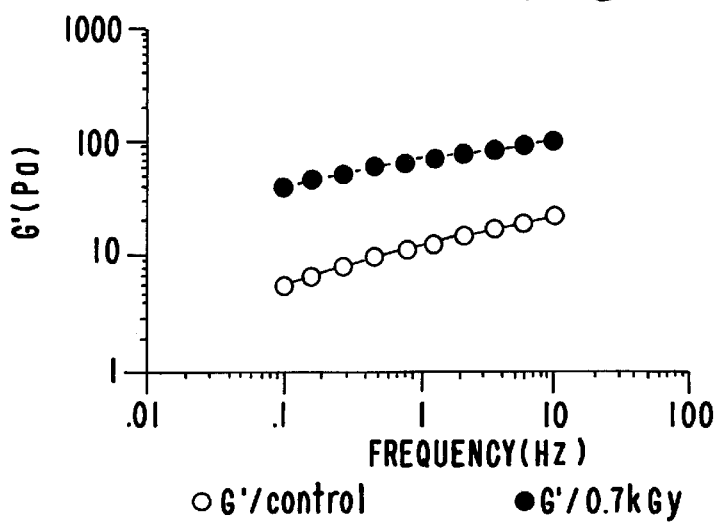
Figure 11B:
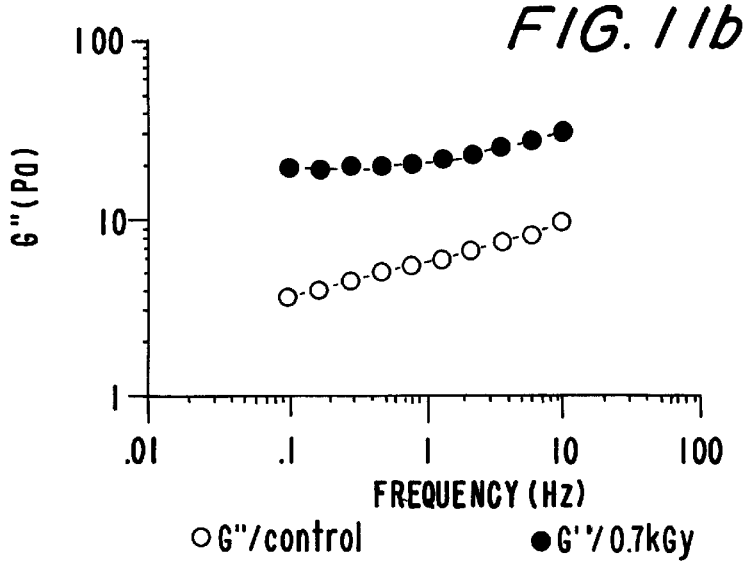

FIG. 11a Storage modulus (G') plotted as a function of frequency of 1% in $H_2O$ of control and irradiated xanthan. The solution was heated for 20 min. at 85° C. and the measurements were performed at 25° C. (○) control; (●) 0.7 kGy, FIG. 11b Loss modulus (G") plotted as a function of frequency of 1% in $H_2O$ of control and irradiated xanthan. The solution was heated for 20 min. at 85° C. and the measurements were performed at 25° C. (○) control; (●) 0.7 kGy.

Figure 11C:
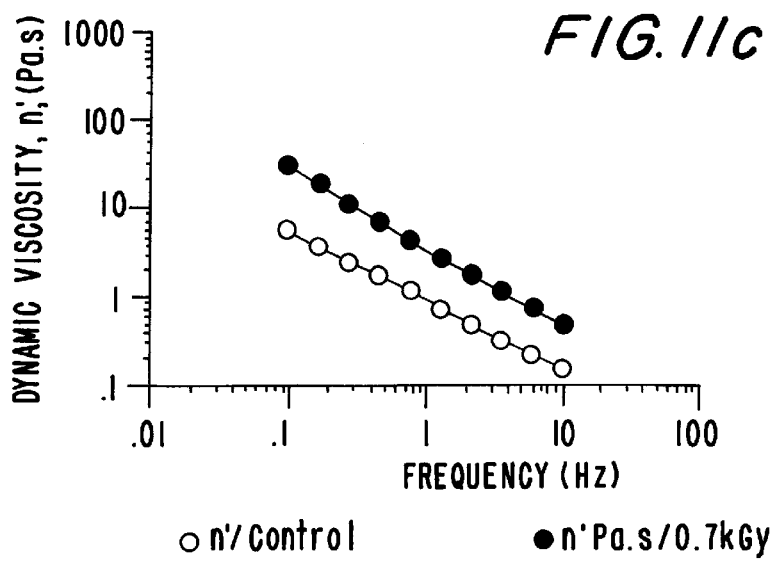

FIG. 11c Dynamic viscosity ($\eta'$) plotted as a function of frequency of 1% in $H_2O$ of control and irradiated xanthan. The solution was heated for 20 min. at 85° C. and the measurements were performed at 25° C. (○) control; (●) 0.7 kGy.

Figure 12:
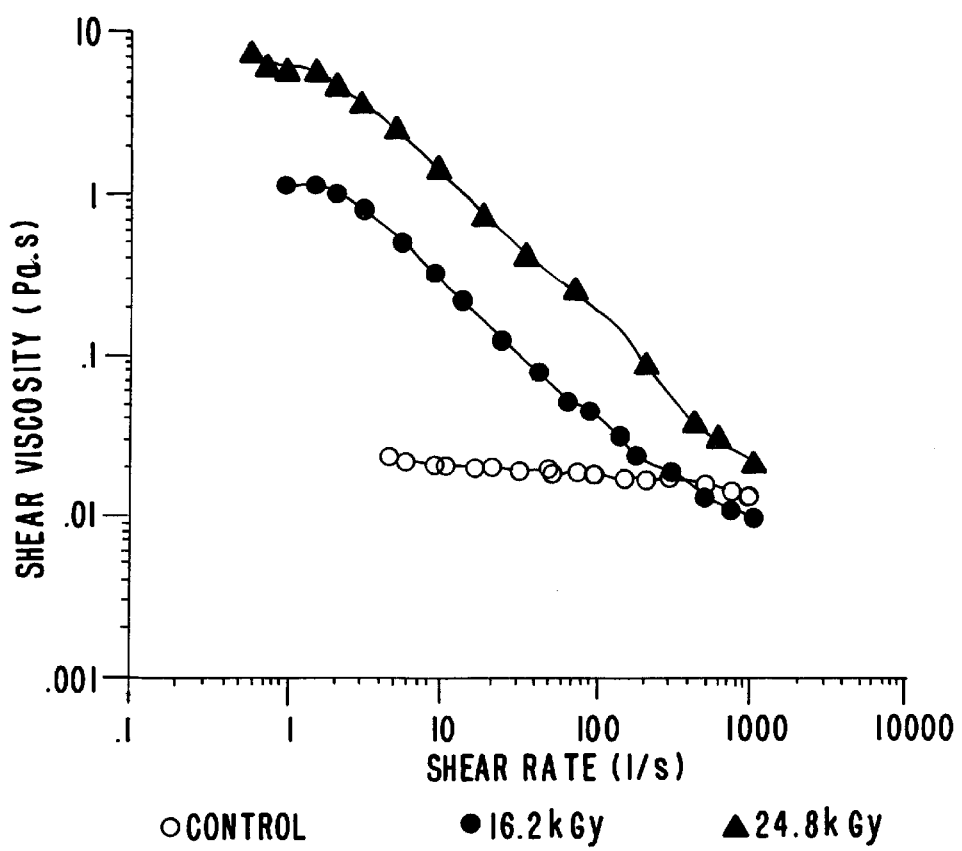

FIG. 12 Shear viscosity profile as a function of shear rate of 1% in $H_2O$ of control and irradiated kappa-carrageenan.

The solution was heated for 20 min. at 85° C. and the measurements were performed at 25° (○) control; (●) 16.2 kGy; (▲) 24.8 kGy.

Figure 13:
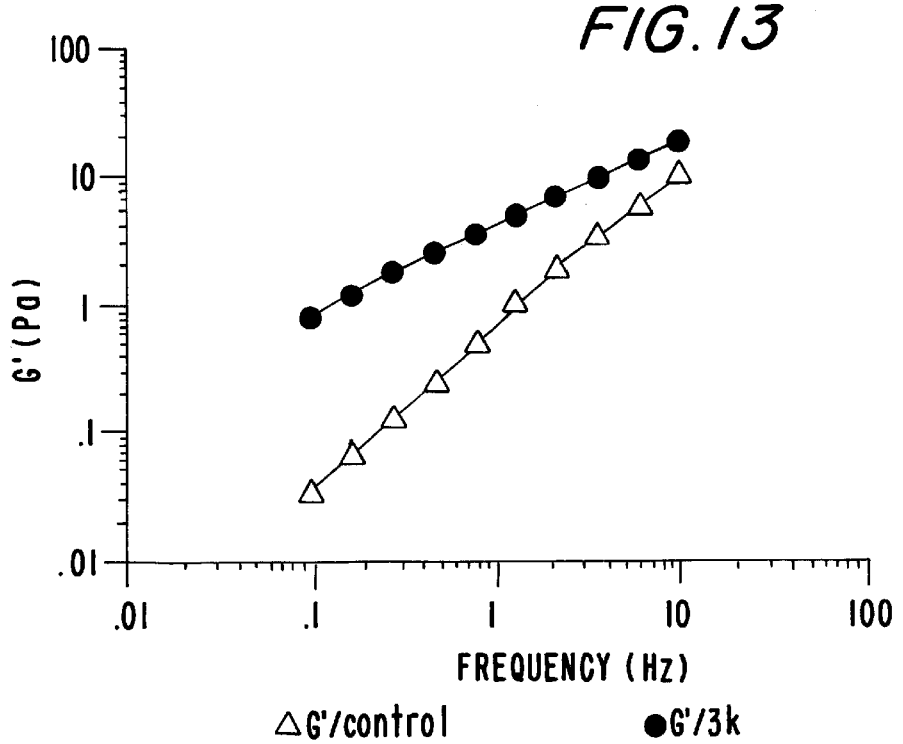

FIG. 13 Storage modulus (G") plotted as a function of frequency of 3.6% (w/v) in $H_2O$ of control and irradiated orange pectin. (△) control; (●) 3 kGy.

Figure 14A:
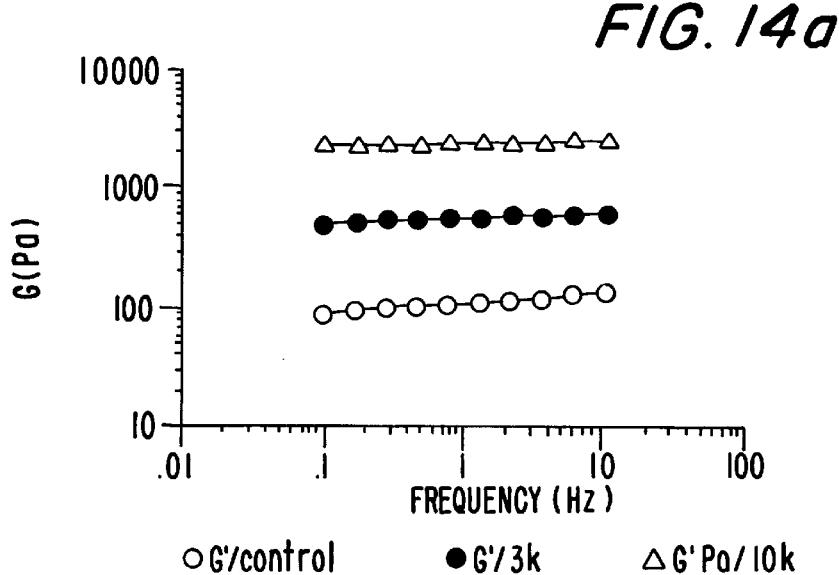
Figure 14B:
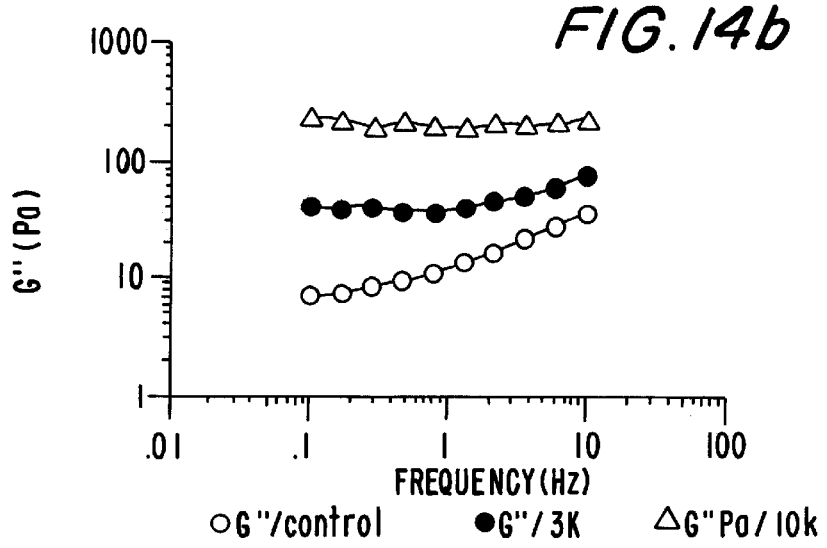
Figure 14C:
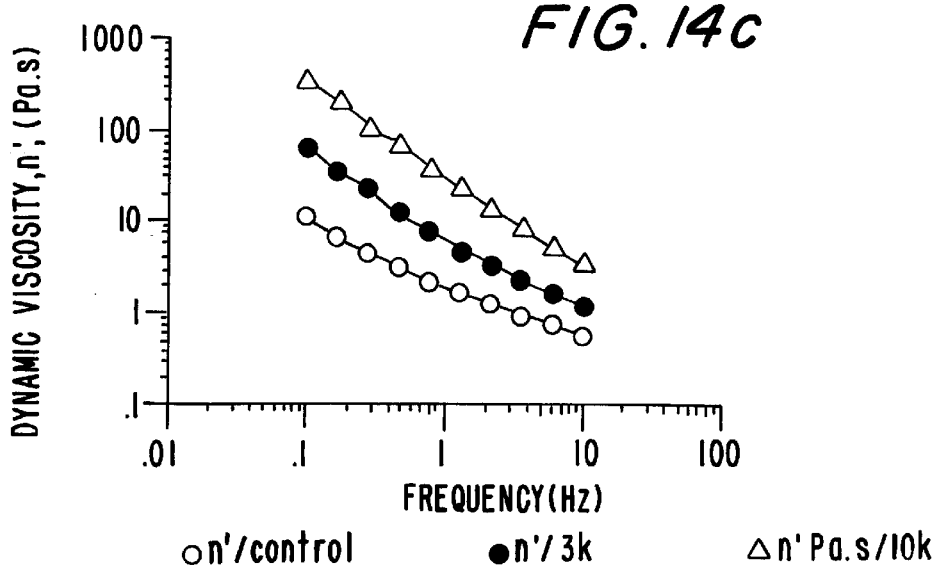

FIG. 14 (a) Storage modulus (G'), (b) loss modulus (G") and (c) dynamic viscosity plotted as a function of frequency of 10% (w/v) in $H_2O$ of control and irradiated gelatin. Samples were heated for 15 min. at 50° C. and the measurements were carried out on cooled samples at 25° C. (○) control; (●) 3 kGy; (△) 10 kGy.

Figure 15:
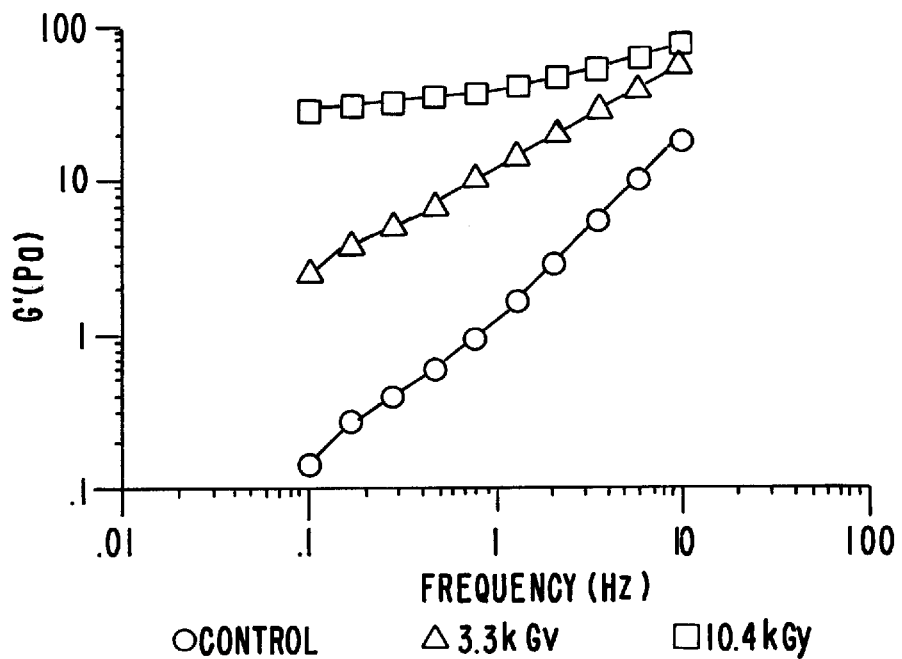

FIG. 15 Storage modulus (G'); plotted as a function of frequency of 4% (w/v) in $H_2O$ of control and irradiated mix containing 90% orange pectin+10% CMC. (○) control; (●) 3.3 kGy; (▲) 10.4 kGy.

Figure 16:
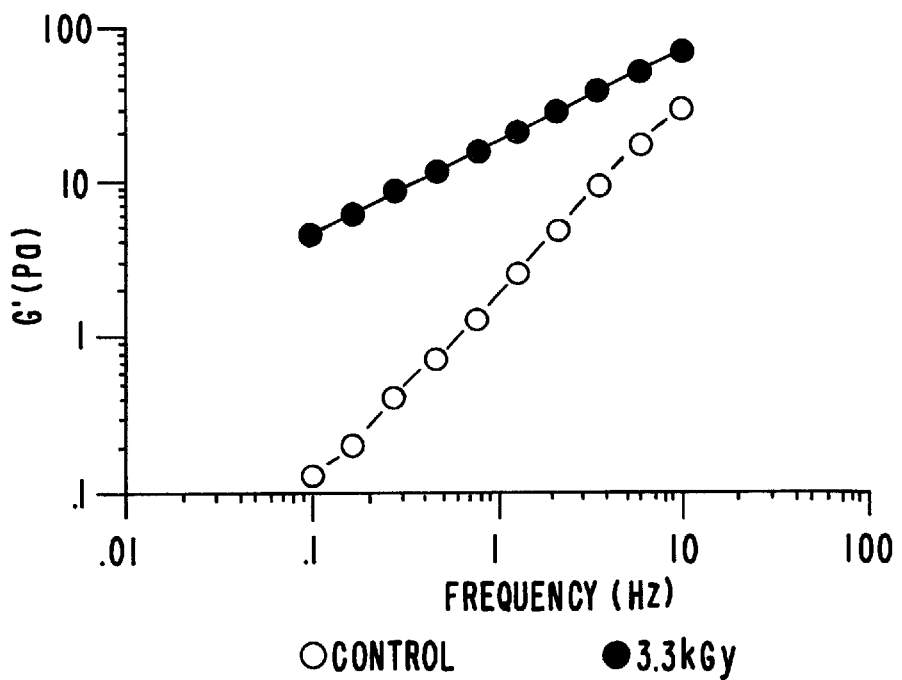

FIG. 16 Storage modulus (G'), plotted as a function of frequency of 4% (w/v) in $H_2O$ of control and irradiated mix containing 90% orange pectin+10% dextran. (○) control; (●) 3.3 kGy; (,29) 10.4 kGy.

Figure 17:
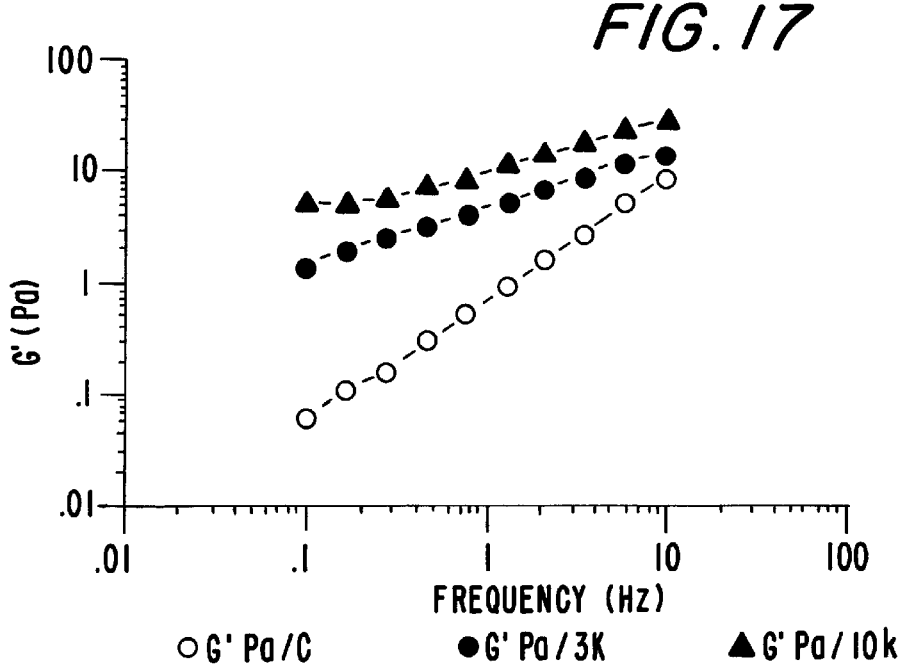

FIG. 17 Storage modulus (G'), plotted as a function of frequency of 4% (w/v) in $H_2O$ of control and irradiated mix containing 50% dextran+50% CMC. (○) control; (●) 3.3 kGy; (▲) 10.4 kGy.

Figure 18:
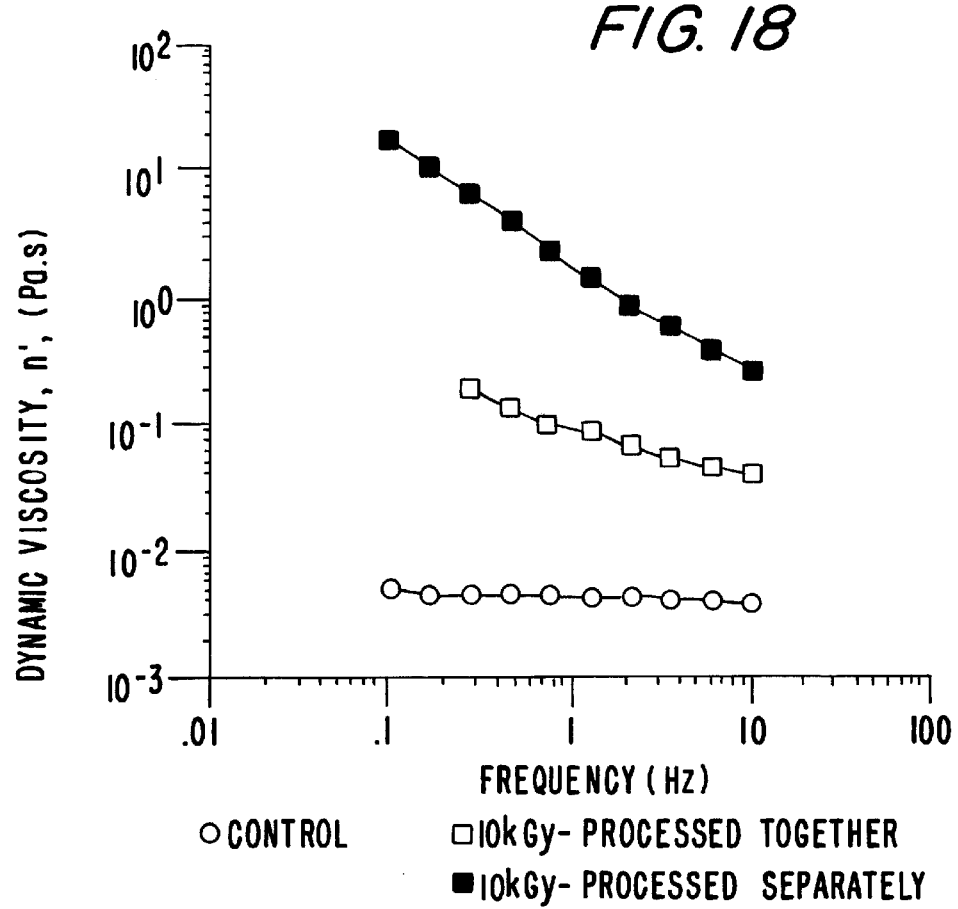

FIG. 18 Dynamic viscosity plotted as a function of frequency of 4% (w/v) in $H_2O$ of control and irradiated mix containing 90% polyvinyl pyrrolidone (PVP)+10% Dextran. (○) control; (□) 10 4 kGy processed together; (■) 10.4 kGy processed separately.

Figure 19A:
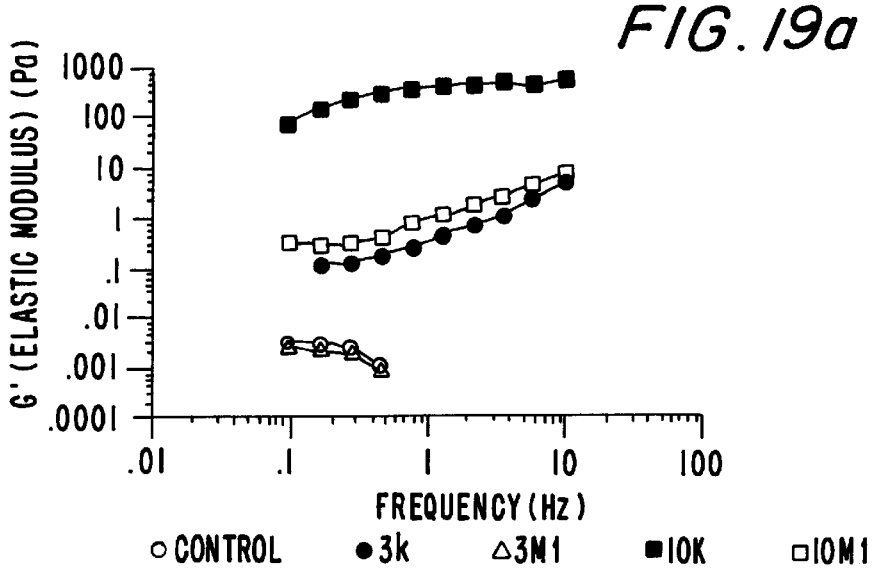
Figure 19B:
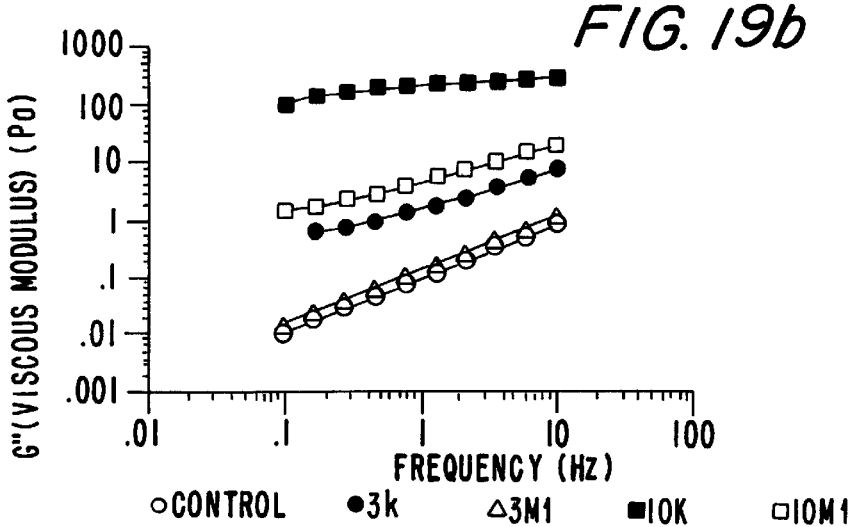
Figure 19C:
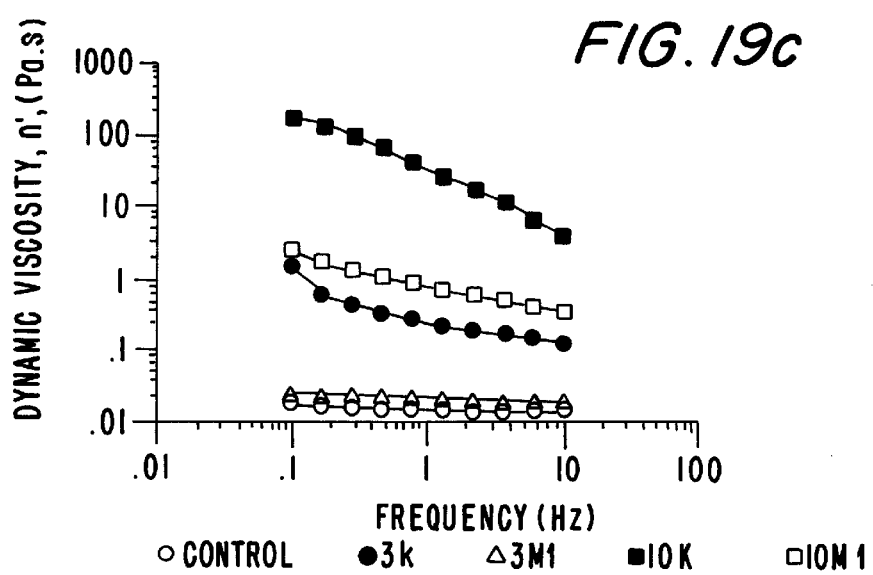

FIG. 19 (a) Storage modulus (G'); (b) Loss modulus (G"); and (c) Dynamic viscosity (η') plotted as a function of frequency of 4% (w/v) in $H_2O$ of control and irradiated mix containing 50% polyvinyl pyrrolidone (PVP)+50% arabinogalactan protein (Gum Arabic). (△) control; (●) 3.1 kGy processed together; (▲) 3.1 kGy processed separately; (■) 10.4 kGy processed together; (□) 10.4 kGy processed separately.

Figure 20A:
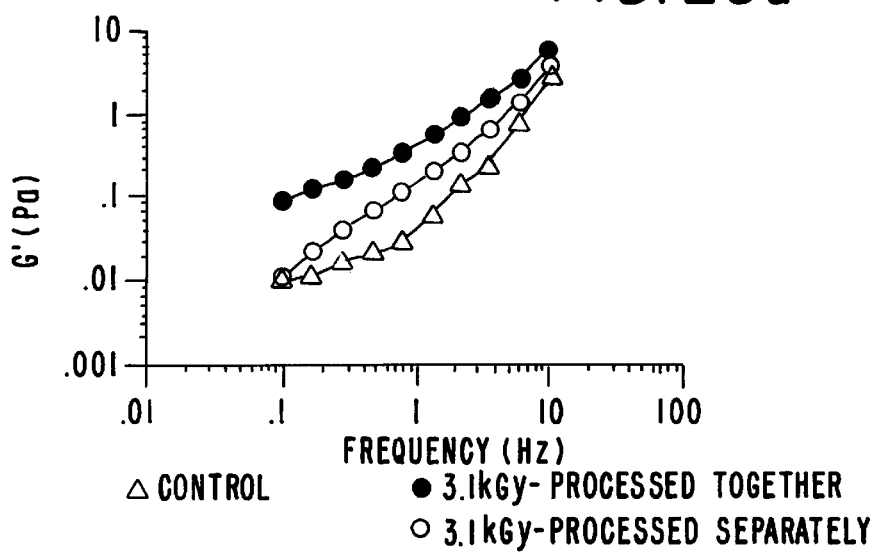
Figure 20B:
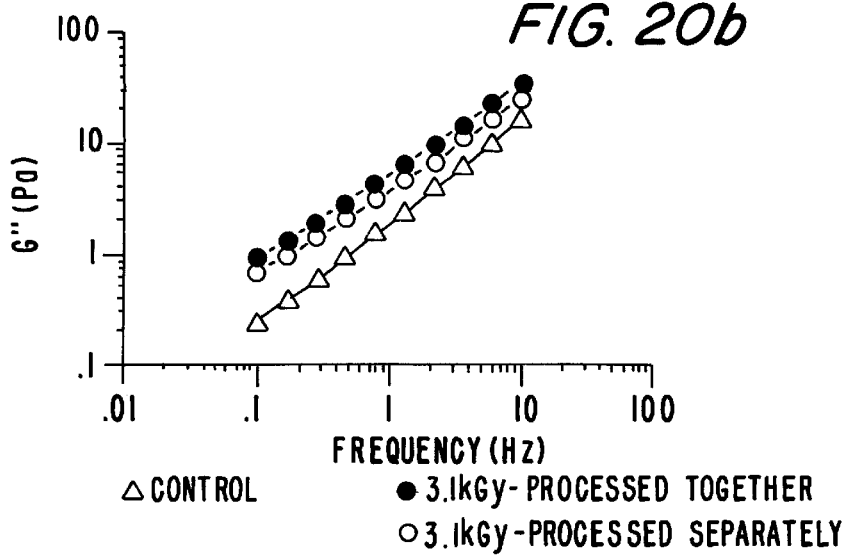
Figure 20C:
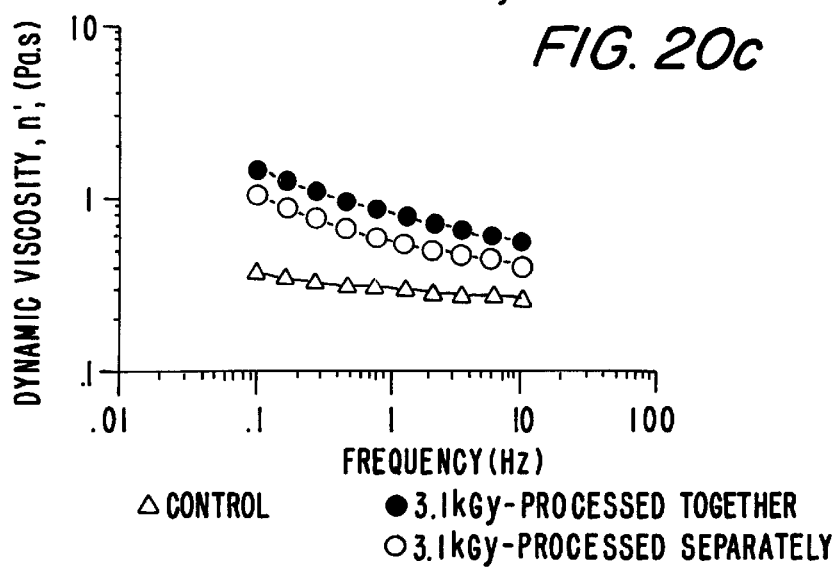

FIG. 20 (a) Storage modulus (G'); (b) loss modulus (G"); (c) dynamic viscosity (η) plotted as a function of frequency of 25% (w/v) in $H_2O$ of control and irradiated mix containing 10% carboxymethyl cellulose (CMC)+90% arabinogalactan protein (Gum Arabic). (○) control; (●) 3.1 kGy processed together; (△) 3.1 kGy processed separately.

Figure 21:
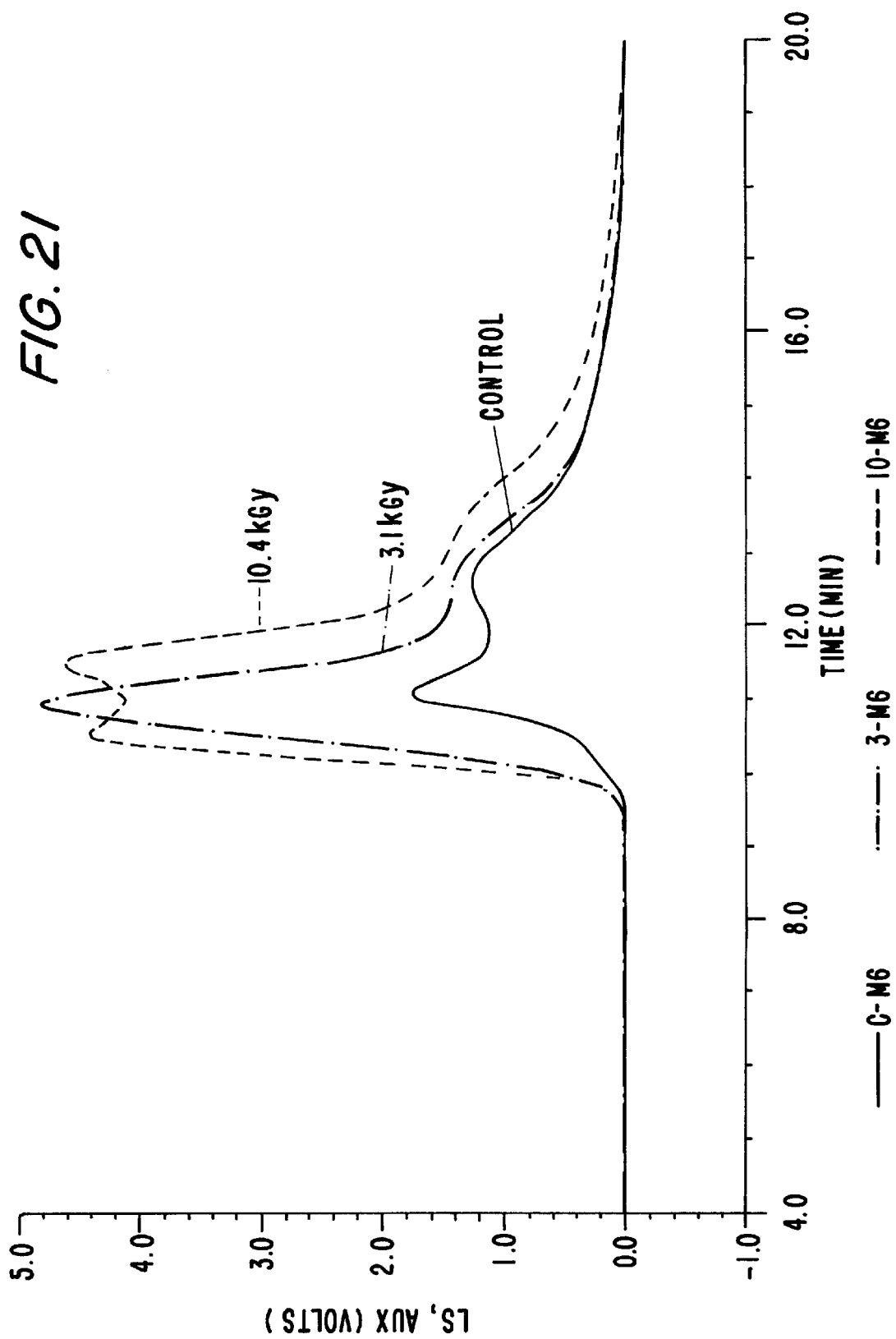

FIG. 21 GPC chromatogram of control and irradiated mix containing 10% carboxymethyl cellulose (CMC)+90% arabinogalactan protein (Gum Arabic).

C-M6 Control 3-M6 3.1 kGy 10-M6 10.4 kGy

Figure 22A:
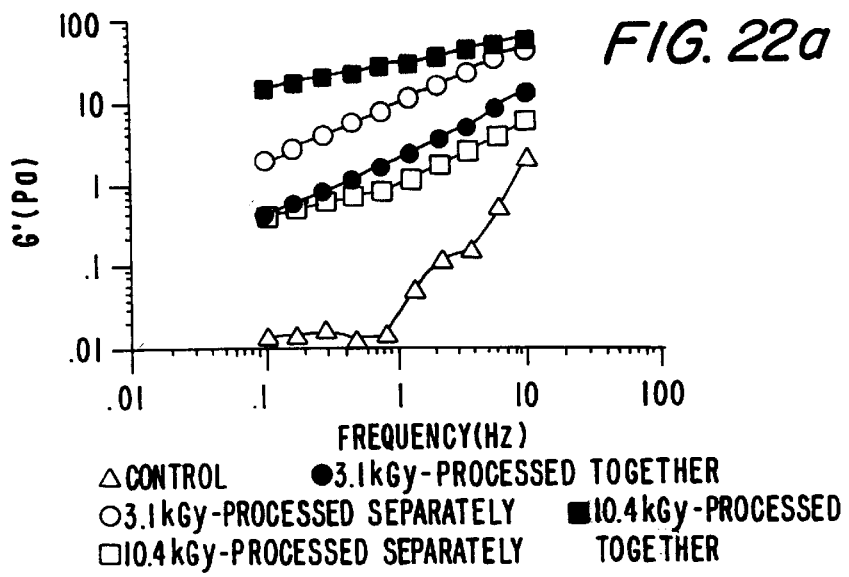
Figure 22B:
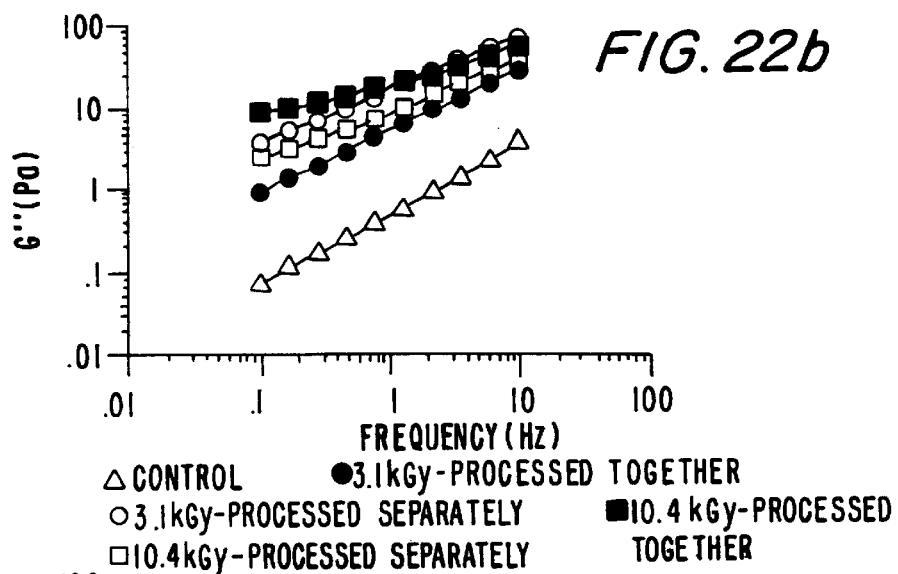
Figure 22C:
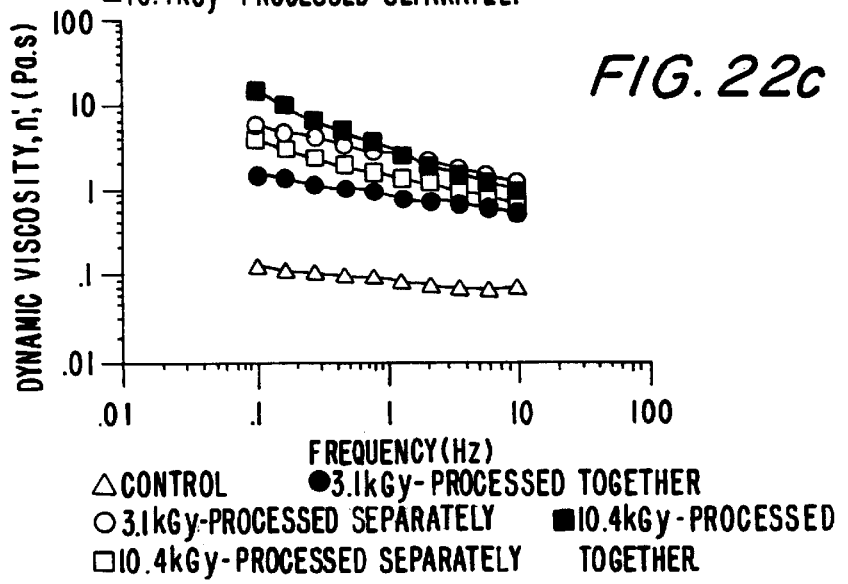

FIG. 22 (a) Storage modulus (G'); (b) loss modulus (G"); (c) dynamic viscosity (η) plotted as a function of frequency of 4% (w/v) in $H_2O$ of control and irradiated mix containing 90% orange pectin+10% dextran. (△) control; (●) 3.1 kGy processed together; (○) 3.1 kGy processed separately; (■) 10.4 kGy processed together; (□) 10.4 kGy processed separately.

DETAILED DESCRIPTION OF THE INVENTION

The invention will now be described in greater detail in the following examples which are not intended to limit the scope of the invention but are merely explanatory thereof.

EXAMPLE 1

Arabinogalactan Proteins

The structures, properties and functionality of the gum exudates *Acacia Senegal* and *Acacia Seyal* have previously been elucidated by us and these species are included within the scope of this example and the invention. They are also included within the specifications of the material commercially known as Gum Arabic of Commerce.

These materials are widely used in industry as adhesives, stabilizers, emulsifiers, flavor encapsulators, materials for preventing sugar crystallization (in confectionery), stabilizing printing ink, etc. This material is a globular cross-linked polysaccharide made up of arabinose, galactose, rhamnose and uronic acid joined together in polysaccharide units of ca. 400,000 molecular weight (MW), with each of the globular polysaccharide units joined together like beads on a string to a protein chain. The protein composition is about 3%. The arabinogalactan proteins are not discrete molecular entities, since on hydrophobic or size exclusion fractionation, two main components can be differentiated with MW ca $1 \times 10^6$ and $4-5 \times 10^5$.

Characterizing Properties Associated with the New Products Produced

A Controlled Increase in Molecular Weight

Figure 1:
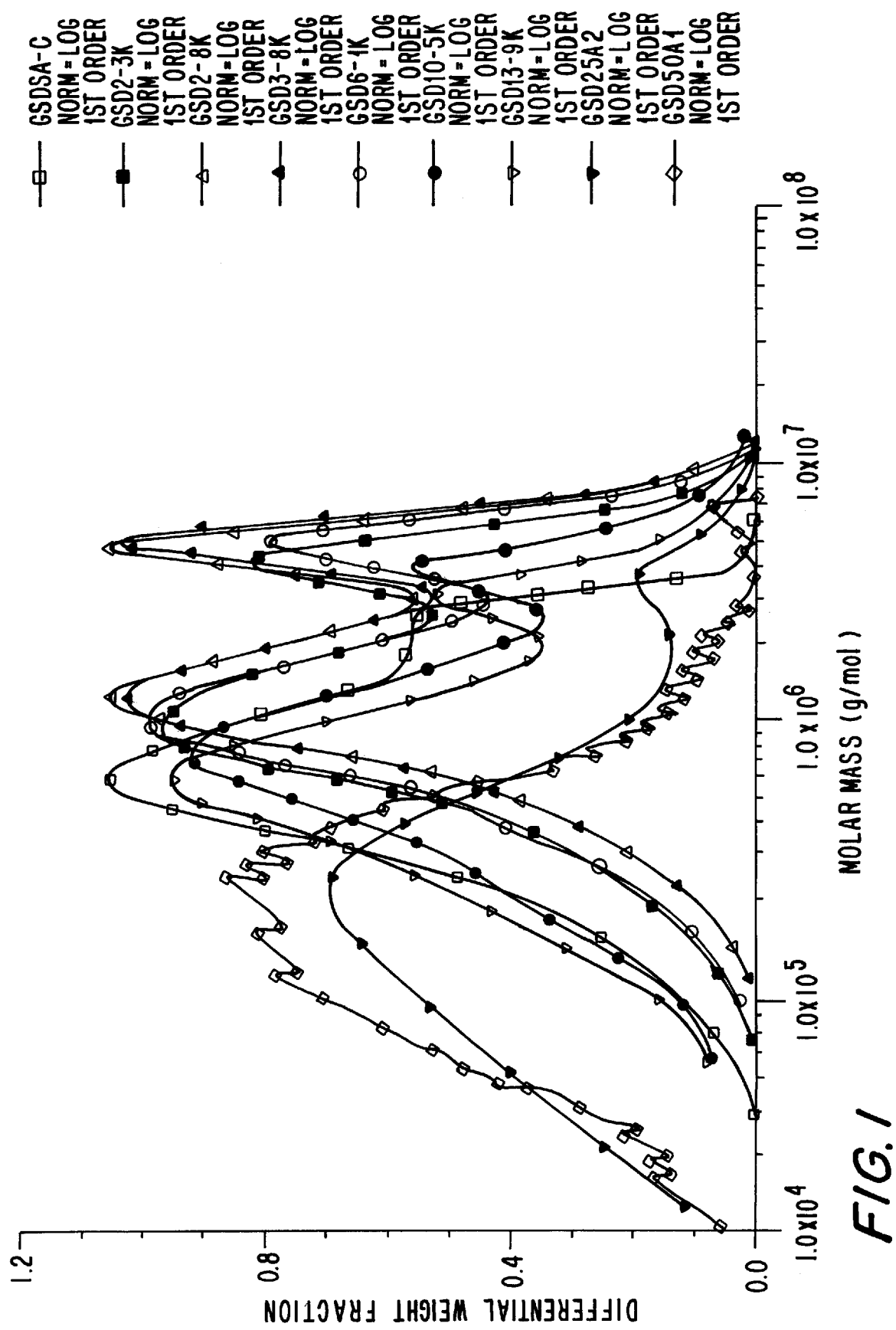
FIG. 1 Differential molar mass distribution of control and irradiated *Acacia Senegal* (spray dried)

The process allows a controlled increased molecular weight of arabinogalactans. The starting material is first fractionated using gel permeation chromatography (GPC) column coupled to a multi-angle laser light scattering detector (MALLS), a concentration detector (Refractive index—RI) and UV absorbance detector at 214 nm. The system allows the molecular weight distribution of the gum to be measured using multi-angle laser light scattering, and thus any changes in the overall structure can be monitored using the three detectors. Typical changes in molecular weight distribution is shown in FIG. 1 and the quantitative results are given in Table 1 for a representative spray dried *Acacia Senegal* gum. To illustrate that the spray drying processing has no influence on the generality of the changes observed, we have also carried out exactly the same experiments using unprocessed (lump) *Acacia Senegal* gum and the results are shown in Table 2, which are directly comparable A 4-fold-soluble. There is a corresponding increase in the root mean square radius of the processed gum.

TABLE 1

Acacia senegal: an arabinogalactan protein (spray dried). % $M_W$ means the mass recovered after injection. $R_g$ is the RMS-radius and P is the polydispersity (P = $M_W/M_n$).

| File name | $M_{wt}$ processed as one peak | % $M_{wt}$ | $R_g$ nm | P | $M_{wt}$ processed as two peaks | % $M_{wt}$ | $R_g$ nm | P | Comments |
|---|---|---|---|---|---|---|---|---|---|
| GSDSA-C | $8.42 \times 10^5 \pm 0.56$ | 98 | — | 2.28 | $2.41 \times 10^6 \pm 0.15$ | 20.9 | 13.3 | 1.40 | Control |
| | | | | | | 77.4 | — | 1.37 | |
| | | | | | $4.18 \times 10^5 \pm 0.25$ | | | | |

TABLE 1-continued

Acacia senegal: an arabinogalactan protein (spray dried). % $M_W$ means the mass recovered after injection. $R_g$ is the RMS-radius and P is the polydispersity (P = $M_W/M_n$).

| File name | $M_{wt}$ processed as one peak | % $M_{wt}$ | $R_g$ nm | P | $M_{wt}$ processed as two peaks | % $M_{wt}$ | $R_g$ nm | P | Comments |
|---|---|---|---|---|---|---|---|---|---|
| GSD2-3K | $2.32 \times 10^6 \pm 0.21$ | 96.8 | 8.3 | 4.78 | $7.20 \times 10^6 \pm 0.67$ <br> $4.76 \times 10^5 \pm 0.43$ | 26.5 <br> 70.6 | 21.2 <br> — | 2.38 <br> 1.28 | 2.3 KGy |
| GSD2-8K | $3.44 \times 10^6 \pm 0.30$ | 92.1 | 27.8 | 5.85 | $1.07 \times 10^7 \pm 0.09$ <br> $5.71 \times 10^5 \pm 0.11$ | 26.1 <br> 66.1 | 28.7 <br> 27.4 | 2.37 <br> 1.30 | 2.8 KGy |
| GSD3-8K | $3.69 \times 10^6 \pm 0.33$ | 83.7 | 29.5 | 6.09 | $1.06 \times 10^7 \pm 0.09$ <br> $5.52 \times 10^5 \pm 0.48$ | 26.0 <br> 57.9 | 30.1 <br> 29.3 | 2.59 <br> 1.25 | 3.8 KGy |
| GSD6-1K | $3.12 \times 10^6 \pm 0.26$ | 63.1 | 31.9 | 6.0 | $1.12 \times 10^7 \pm 0.09$ <br> $5.30 \times 10^5 \pm 0.39$ | 15.2 <br> 47.9 | 34.4 <br> 31.0 | 2.63 <br> 1.30 | 6.1 KGy |
| GSD10-5K | $1.81 \times 10^6 \pm 0.16$ | 47.6 | 29.3 | 5.65 | $7.93 \times 10^6 \pm 0.72$ <br> $3.65 \times 10^5 \pm 0.32$ | 9.1 <br> 37.8 | 32.6 <br> 27.8 | 2.51 <br> 1.37 | 10.5 KGy |
| GSD13-9K | $1.54 \times 10^6 \pm 0.17$ | 37.5 | 26.3 | 5.70 | $7.11 \times 10^6 \pm 0.79$ <br> $5.30 \times 10^5 \pm 0.39$ | 6.8 <br> 30.0 | 31.0 <br> 23.0 | 2.50 <br> 1.39 | 13.9 KGy |
| GSD25A | $7.98 \times 10^5 \pm 0.71$ | 18.3 | — | 4.48 | $7.32 \times 10^6 \pm 0.55$ <br> $2.69 \times 10^5 \pm 0.19$ | 9.1 <br> 16.5 | 32.6 <br> 38.2 | 2.51 <br> 1.74 | 24.8 KGy |
| GSD49-8A | $3.27 \times 10^5 \pm 0.53$ | 12.4 | — | 2.18 | $2.48 \times 10^6 \pm 0.56$ <br> $2.01 \times 10^5 \pm 0.32$ | 0.33 <br> 12.2 | 27.6 <br> — | 1.5 <br> 1.39 | 49.8 KGy |

TABLE 2

Acacia Senegal gum (unprocessed/lump gum). % $M_W$ means the mass recovered after injection. $R_g$ is the RMS-radius and P is the polydispersity (P = $M_W/M_n$).

| File name | $M_{wt}$ processed as one peak | % $M_W$ | $R_g$ nm | P | $M_{wt}$ processed as two peaks | % $M_W$ | $R_g$ nm | P | Comments |
|---|---|---|---|---|---|---|---|---|---|
| HASHAB | $4.92 \times 10^5 \pm 0.25$ | 104 | — | 1.73 | $1.64 \times 10^6 \pm 0.08$ <br> $2.96 \times 10^5 \pm 0.15$ | 15.1 <br> 89.5 | 10 <br> — | 1.26 <br> 1.18 | Control |
| HAS0-7A1 | $5.71 \times 10^5 \pm 0.14$ | 107 | 24.8 | 2.10 | $2.19 \times 10^6 \pm 0.05$ <br> $2.92 \times 10^5 \pm 0.08$ | 15.7 <br> 91.9 | 28.9 <br> 24.0 | 1.43 <br> 1.23 | 0.7 KGy |
| HAS1-2A1 | $7.88 \times 10^5 \pm 0.19$ | 110 | 17.5 | 2.67 | $3.13 \times 10^6 \pm 0.09$ <br> $3.18 \times 10^5 \pm 0.05$ | 18.6 <br> 93.1 | 30.8 <br> 13.2 | 1.63 <br> 1.26 | 1.2 KGy |
| HSA2-3K | $6.94 \times 10^5 \pm 0.59$ | 88.9 | — | 3.23 | $3.46 \times 10^6 \pm 0.31$ <br> $2.49 \times 10^5 \pm 0.19$ | 15.7 <br> 97.7 | 21.5 <br> — | 1.95 <br> 1.31 | 2.3 KGy |
| HSA2-8K | $1.04 \times 10^6 \pm 0.08$ | 110 | — | 3.97 | $4.45 \times 10^6 \pm 0.35$ <br> $2.77 \times 10^5 \pm 0.21$ | 20.1 <br> 90.1 | 23.3 <br> — | 2.14 <br> 1.27 | 2.8 KGy |
| HSA3-8K | $9.99 \times 10^5 \pm 0.77$ | 113 | — | 3.67 | $4.76 \times 10^6 \pm 0.37$ <br> $2.96 \times 10^5 \pm 0.21$ | 17.8 <br> 96.0 | 25.9 <br> — | 2.17 <br> 1.26 | 3.8 KGy |
| HAS5-9A | $1.12 \times 10^6 \pm 0.27$ | 108 | 29.1 | 3.54 | $4.25 \times 10^6 \pm 0.09$ <br> $3.40 \times 10^5 \pm 0.09$ | 22.0 <br> 87.3 | 35.5 <br> 27.3 | 1.82 <br> 1.30 | 5.9 KGy |

TABLE 2-continued

Acacia Senegal gum (unprocessed/lump gum). % $M_W$ means the mass recovered after injection.
$R_g$ is the RMS-radius and P is the polydispersity (P = $M_W/M_n$).

| File name | $M_{wt}$ processed as one peak | % $M_W$ | $R_g$ nm | P | $M_{wt}$ processed as two peaks | % $M_W$ | $R_g$ nm | P | Comments |
|---|---|---|---|---|---|---|---|---|---|
| HSA6-1K | $1.31 \times 10^6 \pm 0.12$ | 108 | — | 5.09 | $6.30 \times 10^6 \pm 0.61$<br>$2.83 \times 10^5 \pm 0.26$ | 18.6<br>90.2 | 26.4<br>— | 2.56<br>1.29 | 6.1 KGy |
| HSA10-5K | $1.37 \times 10^6 \pm 0.09$ | 91.9 | 23.0 | 4.55 | $5.80 \times 10^6 \pm 0.40$<br>$3.18 \times 10^5 \pm 0.21$ | 17.7<br>74.4 | 32.2<br>20.3 | 2.43<br>1.27 | 10.5 KGy |
| HSA13-9K | $1.30 \times 10^6 \pm 0.14$ | 76.8 | — | 4.85 | $6.39 \times 10^6 \pm 0.70$<br>$2.97 \times 10^5 \pm 0.31$ | 12.6<br>64.2 | 19.8<br>— | 2.43<br>1.30 | 13.9 KGy |
| HAS16-2A | $1.38 \times 10^5 \pm 0.03$ | 85.6 | 28.6 | 4.53 | $5.79 \times 10^6 \pm 0.14$<br>$3.50 \times 10^5 \pm 0.08$ | 16.1<br>69.5 | 35.9<br>26.5 | 2.06<br>1.38 | 16.2 KGy |
| HAS24-8A | $1.27 \times 10^6 \pm 0.37$ | 70 | 27.7 | 4.27 | $5.83 \times 10^6 \pm 0.07$<br>$3.27 \times 10^5 \pm 0.06$ | 12.0<br>57.7 | 35.4<br>25.8 | 2.12<br>1.29 | 24.8 KGy |
| HAS49-8A | $1.25 \times 10^6 \pm 0.03$ | 75 | 34.2 | 3.97 | $5.14 \times 10^6 \pm 0.15$<br>$3.45 \times 10^5 \pm 0.09$ | 14.3<br>60.8 | 35.8<br>33.8 | 2.06<br>1.30 | 49.8 KGy |

Tables 1 and 2 also illustrate how it is possible to progressively convert any amount or proportion of the soluble arabinoglactan protein into hydrogel. Moreover the particle size of the hydrogel can be varied according to need. Coulter counter distributions show, for example, this variation from a mean of 160 μm upwards into solidified hydrogel systems at 2000 μm and beyond (FIG. 2). The pattern then is of a progressive increase in MW, with a portion even reaching $100 \times 10^6$, linking up at this stage to give gel particles which are quite visible. These particles are not even able to enter the fractionating column, and consume the highest MW material, which accounts for the levelling off of the soluble gum after 6.1 Kgy.

Increasing the Proportion of the Higher Molecular Weight Emulsification Component The high molecular weight arabinogalactan protein (AGP) component of Acacia gums is responsible for the emulsification effectiveness of oil in water emulsion. The higher proportion in *Acacia Senegal* compared with *Acacia Seyal* makes this gum more valuable, and as such commands a higher price. The AGP coats the oil droplets and prevents them from re-associating. Therefore, such an emulsion is stable for months and even years. To increase the amount of this component would in itself give added value to the gum. We are able to demonstrate that by applying the radiation processing method to *Acacia Seyal* the proportion of the higher molecular weight component (AGP) can be increased. This increase is reflected by the molecular weight distribution and the RMS-radius and so gives a new material with properties more akin to A. senegal (Table 3).

TABLE 3

Acacia Seyal (Talha). % $M_W$ means the mass recovered after injection.
$R_g$ is the RMS-radius and P is the polydispersity (P = $M_W/M_n$).

| File name | $M_W$ processed as one peak | % $M_{wt}$ | $R_g$ nm | P | $M_{wt}$ processed as two peaks | % $M_{wt}$ | $R_g$ nm | P | Comments |
|---|---|---|---|---|---|---|---|---|---|
| T-C1 | $1.15 \times 10^6 \pm 0.02$ | 106 | 20.6 | 1.98 | $2.98 \times 10^6 \pm 0.05$<br>$5.58 \times 10^5 \pm 0.20$ | 26.58<br>2.3 | 26.11<br>8.5 | 1.37<br>1.28 | Control |
| T0-7A1 | $1.65 \times 10^6 \pm 0.33$ | 103 | 25.1 | 2.89 | $4.45 \times 10^6 \pm 0.09$<br>$5.44 \times 10^5 \pm 0.09$ | 29.27<br>4.0 | 31.12<br>2.0 | 1.65<br>1.27 | 0.7 kGy |
| T1-2A1 | $1.67 \times 10^6 \pm 0.02$ | 101 | 23.2 | 2.32 | $3.81 \times 10^6 \pm 0.06$<br>$6.09 \times 10^5 \pm 0.07$ | 33.56<br>8.2 | 27.8<br>20.8 | 1.54<br>1.14 | 1.2 kGy |

TABLE 3-continued

Acacia Seyal (Talha).% $M_W$ means the mass recovered after injection. $R_g$ is the RMS-radius and P is the polydispersity (P = $M_w/M_n$).

| File name | $M_W$ processed as one peak | % $M_{wt}$ | $R_g$ nm | P | $M_{wt}$ processed as two peaks | % $M_{wt}$ | $R_g$ nm | P | Comments |
|---|---|---|---|---|---|---|---|---|---|
| T1-5A1 | $1.78 \times 10^6 \pm 0.39$ | 108 | 21.5 | 2.51 | $4.31 \times 10^6 \pm 0.07$ $5.72 \times 10^5 \pm 0.07$ | 28.17 1.9 | 36.91 7.2 | 1.63 1.13 | 1.5 kGy |
| T3-2A1 | $3.17 \times 10^6 \pm 0.06$ | 105 | 30.4 | 3.91 | $7.64 \times 10^6 \pm 0.16$ $6.15 \times 10^5 \pm 0.09$ | 38.16 8.1 | 35.4 27.2 | 2.18 1.14 | 3.2 kGy |
| T5-9A1 | $3.33 \times 10^6 \pm 0.83$ | 99.1 | 35.1 | 4.31 | $8.61 \times 10^6 \pm 0.22$ $6.49 \times 10^5 \pm 0.12$ | 33.46 6.0 | 38.43 3.3 | 2.26 1.17 | 5.9 kGy |
| T24-8A1 | $3.07 \times 10^6 \pm 0.06$ | 78.5 | 33.5 | 3.74 | $7.05 \times 10^6 \pm 0.14$ $6.31 \times 10^5 \pm 0.12$ | 29.64 8.0 | 35.9 32.1 | 2.09 1.14 | 24.8 kGy |
| T49-8A1 | $3.05 \times 10^6 \pm 0.07$ | 72.4 | 35.0 | 4.17 | $7.33 \times 10^6 \pm 0.17$ $5.70 \times 10^5 \pm 0.10$ | 26.64 5.4 | 37.33 3.6 | 2.23 1.14 | 49.8 kGy |

Table 3 illustrates how the high molecular weight component can be increased in molecular weight from 3 to 8 million, and its amount increased from 26% to 38%. Using hydrophobic interaction chromatography (HIC) the individual components were fractionated. The results confirm the increased proportion of the AGP component reflected by the increased amount of protein by UV monitoring at 214 nm as shown in FIG. 3.

Improved Emulsification Performance

The modified acacia gum samples were evaluated. The results of the evaluation of emulsification effectiveness showed:

When *Acacia Senegal* was converted into a new product with increased molecular weight, it proved to be a better emulsifier than the original unprocessed control When *Acacia Seyal,* the least effective emulsifier compared with *Acacia Senegal* was processed to increase its molecular weight and to give the same amount of high molecular weight component as *Acacia Senegal,* its performance was as good. Thus in effect, the *Acacia Seyal* had been converted at least with respect to its emulsification behavior, to the more valuable *Acacia Senegal.*

No Introduction of New Chemical Groups

The doses of radiation are relatively low in relation to those which would induce significant chemical change when the same material is irradiated in the absence of the mediating gas. Chemical analyses have shown that there is no significant structural change introduced by the process as shown in Table 4.

TABLE 4

Physicochemical and Chemical Properties of Original and Irradiated Gum (25 kGy 10 Mev electrons volt)

|  | Control | Irradiated |
|---|---|---|
| % moisture | 12.5 | 12.4 |
| Specific rotation | +52 | +52 |
| Limiting viscosity (cc/g) | 12 | 16 |
| % sugars | 5 | 4 |
| Rhamnose | | |
| Arabinose | 45 | 46 |
| Galactose | 34 | 34 |
| Glucuronic acid | 15 | 15 |
| Nitrogen | 0.15 | 0.15 |

For precise evaluation $^{13}$C-NMR Nuclear magnetic resonance spectra of the unprocessed and processed gum for which maximum molecular weight change had been found were compared. No difference was found between the processed and unprocessed gum (FIGS. 4*a* and 4*b*). Thus no new chemical groups had been introduced as a result of the processing.

Controlled Increase in Viscosity and Viscoelasticity

The changes in shear viscosity with shear rate reflect the molecular weight changes which were found. Initially the gum is a compact globular system, with no significant effect of shear. At this stage the polysaccharide acts as a set of small compact balls, with no shear thinning. As the dose of radiation used for processing is increased, an entangled network is produced, typical of longer entangled molecules when shear thinning can be observed (FIG. 5). There is at least 1000-fold increase in viscosity at zero shear after a dose of 13 kGy.

Figure 6A:
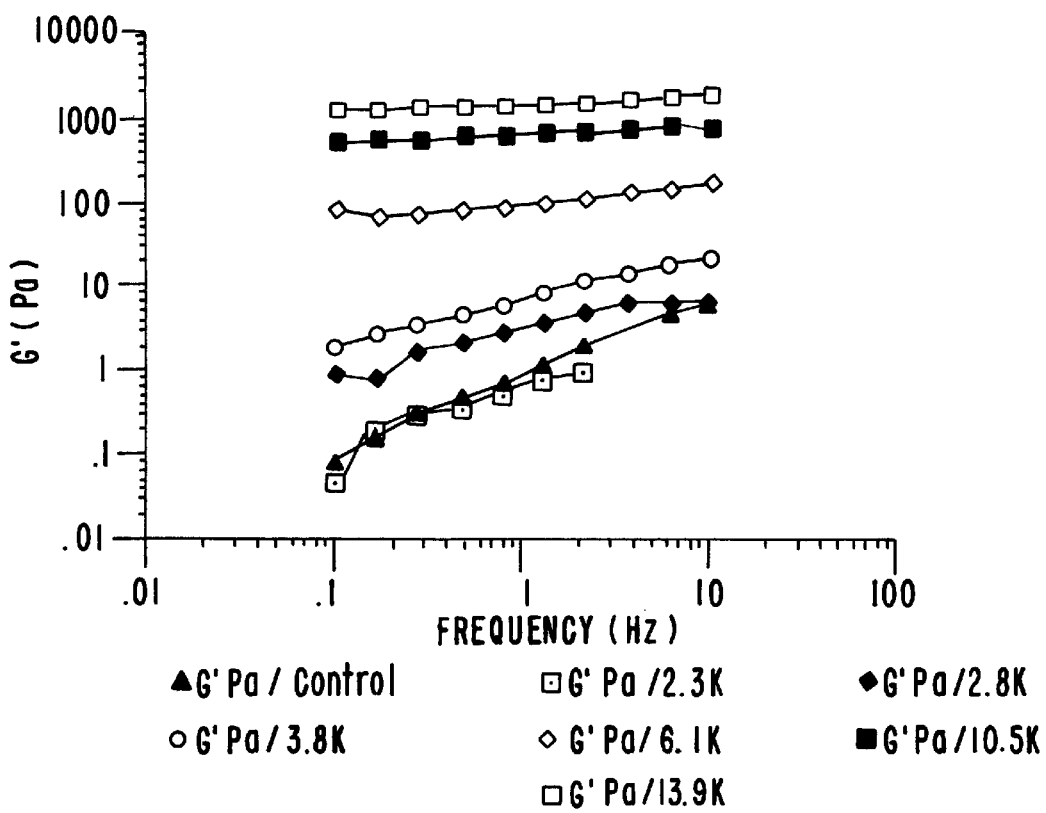
Figure 6B:
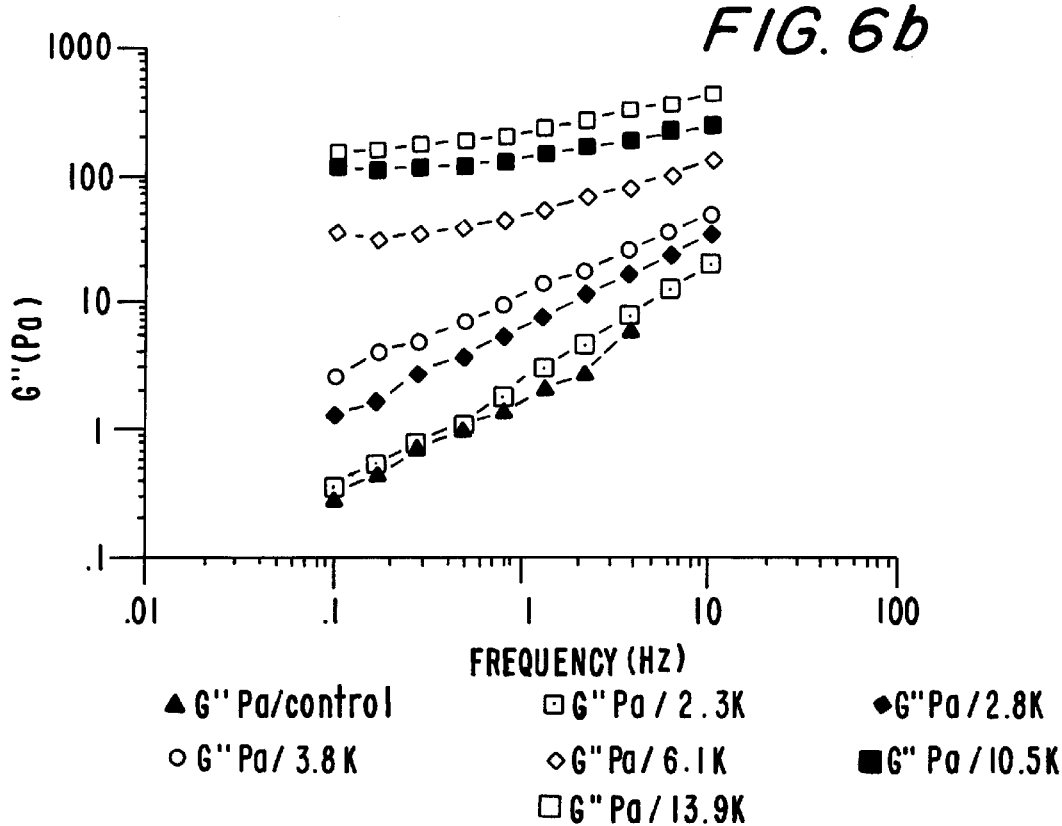

Oscillation measurements also confirmed the above observations (FIGS. 6*a* and 6*b*). Here, the storage modulus (G'-FIG. 6*a*) and the loss modulus (G"-FIG. 6*b*) are plotted as a function of frequency. The dynamic network build up, is again, reflected by the change from dilute solution response (that is G">G') to concentrated solution (G'>G") with a cross-over frequency shifted to lower frequency with increasing $M_W$) and finally to strong gel behavior where G' and G" are independent of frequency. The dynamic viscosity is similar to shear viscosity profile given in FIG. 5, with shear thinning developing, as a result of building a network structure capable of entanglements, with increasing dose. Thus the viscosity can be increased as required and when necessary the system can be converted into a hydrogel, which is a highly viscoelastic state.

Improved Interaction with Water (Enhanced Water Binding Properties)

As a result of increasing its molecular dimensions, it is possible to control the water binding properties of the arabinoglactan protein. This was demonstrated using pulsed nuclear magnetic resonance spectrometry.

The spin—spin relaxation times ($T_2$) for the processed and unprocessed *Acacia Senegal* and *Acacia Seyal* aqueous solutions are shown in Table 5. Measurements were carried out using a 25 MHz Pulse NMR at 30° C. Completely soluble *Acacia Seyal* sample were selected, and here only one kind of $T_2$ is evident. Since $T_2$ of bulk water varies from 2 to 4 sec, and the values found for the *Acacia Seyal* samples are 1 sec or less, it is evident that the molecular motion of the water is restricted by the acacia gum. In other words the acacia samples bind water. Our studies using differential scanning calorimetry have previously demonstrated the effectiveness of the acacia gum in binding water. See "Hydration characteristics of the gum exudate from *Acacia Senegal*, G. O. Phillips, et al, Food Hydrocolloids, Vol 10 (1), 1996, pp 11–19.

As shown in Table 5, the value of $T_2$ decreases with molecular weight. This shows that the amount of bound water increases with molecular weight.

The spray dried *Acacia Senegal* samples showed two kinds of $T_2$ values, since the selected gums have a gel component. The same trend however is shown for the increased water binding with increased molecular weight for the free water component. The reverse is true for the gel component. With increased molecular weight, the hydrogel structure is more loose and the extent of the water immobilization decreases with molecular weight.

The $T_2$ of the dry samples was also measured and is listed in Table 6. Both types of samples show two kinds of $T_2$. $T_{2S}$ relates to the relaxation time for the proton of the OH groups in the gum and $T_{2L}$ is the relaxation time for the absorbed water. Again there is an effect of molecular weight to decrease relaxation time, which fits in with the aqueous solution observations and those carried out on the "dry" samples.

TABLE 5

Spin-spin relaxation time ($T_2$) for Gum Arabic aqueous solutions.
Measurements were carried out using a pulse NMR at 30° C.

| Sample | Conc. | $T_{2S}$ | | $T_{2L}$ | | Treatment |
|---|---|---|---|---|---|---|
| Seyal (1.2) | 10.0 | — | | 1000.00 | (100%) | Control |
| Seyal (3.3) | 10.0 | — | | 980.34 | (100%) | 5.9 kGy |
| Seyal (3.0) | 10.0 | — | | 908.18 | (100%) | 49.8 kGy |
| Senegal (0.84) | 10.0 | 55.79 | (5.6%) | 374.19 | (94.4%) | Control |
| Senegal (3.1) | 9.91 | 78.13 | (7.9%) | 341.91 | (92.1%) | 6.1 kGy |
| Senegal (3.3) | 10.0 | 112.54 | (57.2%) | 368.20 | (42.8%) | 49.8 kGy |

TABLE 6

Spin-spin relaxation time ($T_2$) for dry Gum Arabic samples.
Measurements were carried out using a pulse NMR at 30° C.

| Sample | $T_{2S}$ | | $T_{2L}$ | | Treatment |
|---|---|---|---|---|---|
| MW × 10⁶ | (μsec) | (%) | (μsec) | (%) | |
| Seyal (1.2) | 15.58 | (74.9%) | 242.11 | (25.1%) | Control |
| Seyal (3.3) | 15.45 | (77.9%) | 207.82 | (22.1%) | 5.9 kGy |
| Seyal (3.0) | 15.64 | (76.9%) | 202.43 | (23.1%) | 49.8 kGy |
| Senegal (0.84) | 16.51 | (75.8%) | 309.93 | (24.2%) | Control |
| Senegal (3.1) | 15.95 | (77.3%) | 284.97 | (22.7%) | 6.1 kGy |
| Senegal (3.3) | 15.95 | (78.4%) | 265.98 | (21.6%) | 49.8 kGy |

EXAMPLE 2

Natural (Unsubstituted) and Chemically Modified Polysaccharides

The identical type of modification can be achieved with the widest range of polysaccharides available. Here polysaccharides typical of the various groups will be described. The results will be summarized, but the type of information already described is available and forms part of this claim.

The process modification herein described can be achieved with the widest range of polysaccharide systems available. It is not possible to illustrate this with every single polysaccharide and those which have been chemically modified. Nevertheless, we have selected representative samples from the various groups and families to show that similar changes can be produced over the whole range of such materials and that the behavior is universal. In this section, we provide illustrative examples commensurate in scope with the product claims set forth below.

DEXTRAN—a Bacterial Branched Chain Polysaccharide.

As is known, the basic skeleton of dextran consists of (1–6) linked D-glucose units with side chains attached to 0–3 of the backbone chain units. The degree of branching has been determined to be 5%. There is also some indication of a small proportion of α-D(1-3) branches. However, many aspects of the fine structure remain to be resolved.

Dextran is used as blood-plasma substitutes and for this purpose needs to have a variety of molecular weights. They are also used as standards for the measurement of molecular weights. For this reason it would be advantageous to have a method which would precisely tailor the molecular weight to particular values.

The dextran selected for the example is of high average MW ($1.44 \times 10^6$), with two peaks observable in the chromatogram. The weight average molecular weight of each peak was determined and found to be $2.34 \times 10^6$ and $2.05 \times 10^5$. After a dose of 1.2 kGy radiation, there was an increase in MW of the average ($3.04 \times 10^6$) and highest MW component ($4.58 \times 10^6$). The molar mass distributions illustrate the overall increase in MW distribution. (FIG. 7a) The gel formation starts after a dose of 1.2 KGy as reflected by the decrease in the mass recovery (Table 7). Again, the gel formation increases with the irradiation dose. As the dose is increased, the MW levels off and then decreases as gel is formed by cross-linking of the high MW soluble polysaccharide. After a dose of 49.8 kGy, approximately 83% of the original material will not pass through a 1 μm filter and was used to prepare the gel, which is visually observable. The root mean square radii (RMS) confirm the increases in MW of the disperse polysaccharide system, increasing from the initial value of 26.8 nm to ~43 nm at the highest MW attained. Polydispersity (P) similarly increases showing the broadening of the molecular weight distribution at the higher molecular weight end of the chromatogram (from 4 to 5). Details of the quantitative changes are given in Table 7.

TABLE 7

Changes in molecular weight and RMS-radius of processed Dextran. % $M_W$ means the mass recovered after injection. $R_g$ is the RMS-radius and P is the polydispersity (P = $M_W/M_n$).

| File name | $M_{wt}$ processed as one peak | % $M_{wt}$ | $R_g$ nm | P | $M_{wt}$ processed as two peaks | % $M_{wt}$ | $R_g$ nm | P | Dose |
|---|---|---|---|---|---|---|---|---|---|
| Dextran | $1.44 \times 10^6 \pm 0.10$ | 105 | 16.8 | 3.98 | $2.34 \times 10^6 \pm 0.16$<br>$2.05 \times 10^5 \pm 0.25$ | 67.3<br>43.4 | 21.2<br>5.5 | 1.84<br>1.13 | Control |
| D0-7A1 | $2.38 \times 10^6 \pm 0.49$ | 100 | 37.3 | 3.88 | $3.58 \times 10^6 \pm 0.13$<br>$3.08 \times 10^5 \pm 0.07$ | 64.4<br>36.8 | 39.5<br>32.8 | 2.02<br>1.07 | 0.7 KGy |
| D1-2A1 | $3.04 \times 10^6 \pm 0.09$ | 103 | 43.3 | 4.3 | $4.58 \times 10^6 \pm 0.13$<br>$3.50 \times 10^5 \pm 0.08$ | 65.7<br>38.05 | 43.9<br>43.9 | 2.41<br>1.05 | 1.5 KGy |
| D1-5K | $2.16 \times 10^6 \pm 0.09$ | 92.2 | 35.7 | 5.35 | $3.65 \times 10^6 \pm 0.15$<br>$2.30 \times 10^5 \pm 0.10$ | 52.0<br>41.2 | 37.7<br>33.0 | 2.70<br>1.08 | 1.5 KGy |
| D1-7K | $1.96 \times 10^6 \pm 0.08$ | 93.0 | 34.5 | 5.07 | $3.56 \times 10^6 \pm 0.14$<br>$2.42 \times 10^5 \pm 0.09$ | 48.2<br>45.2 | 36.1<br>32.8 | 2.61<br>1.10 | 1.7 KGy |
| D2-3K | $1.62 \times 10^6 \pm 0.07$ | 85.0 | 30.6 | 5.24 | $3.11 \times 10^6 \pm 0.14$<br>$2.10 \times 10^5 \pm 0.11$ | 41.0<br>44.0 | 34.6<br>26.2 | 2.45<br>1.16 | 2.3 KGy |
| D2-8K | $1.21 \times 10^6 \pm 0.05$ | 71 | 27.1 | 5.23 | $2.51 \times 10^6 \pm 0.11$<br>$1.85 \times 10^5 \pm 0.09$ | 31.3<br>40.0 | 32.4<br>22.5 | 2.38<br>1.31 | 2.8 KGy |
| D3-8K | $9.69 \times 10^5 \pm 0.08$ | 66 | 24.3 | 5.10 | $2.30 \times 10^6 \pm 0.09$<br>$1.74 \times 10^5 \pm 0.07$ | 24.6<br>42.0 | 32.1<br>18.0 | 2.23<br>1.36 | 3.8 KGy |
| D5-9A1 | $9.30 \times 10^5 \pm 0.41$ | 43 | 36.9 | 4.17 | $2.66 \times 10^6 \pm 0.12$<br>$2.08 \times 10^5 \pm 0.09$ | 11.6<br>31.5 | 38.6<br>36.0 | 2.65<br>1.20 | 5.9 KGy |
| D16.2A1 | $3.54 \times 10^5 \pm 0.24$ | 27 | 34.1 | 4.39 | $1.99 \times 10^6 \pm 0.15$<br>$1.20 \times 10^5 \pm 0.05$ | 3.1<br>23.7 | 36.5<br>32.7 | 2.68<br>1.67 | 16.2 KGy |
| D24-8A1 | $1.75 \times 10^5 \pm 0.18$ | 22 | — | 4.97 | $1.15 \times 10^6 \pm 0.14$<br>$9.80 \times 10^5 \pm 0.90$ | 1.29<br>20.8 | 38.6<br>— | | 24.8 KGy |
| D49-8A1 | $1.72 \times 10^5 \pm 0.40$ | 17 | — | 4.42 | | | | | 49.8 KGy |

Rheologically, the changes in viscosity of the processed dextran are very marked. Initially the shear viscosity profile shows a Newtonian behavior which changes to shear thinning with increasing radiation dose. Significantly even though the overall MW shows a decrease at 24.8 kGy, the viscosity is maintained, indicating that the gel-like character of the system is built up prior to gel formation. Oscillation measurements confirmed the above observation where the increase in G' and G" as a function of irradiation dose is shown in FIG. 7b where the changes from dilute solution response to concentrated solution and finally to gel like response are clearly demonstrated.

Carboxymethyl cellulose (CMC): a Chemically Modified Polysaccharide.

When cellulose is steeped in sodium hydroxide solution and the alkali cellulose etherified with sodium monochloracetate, sodium carboxymethyl cellulose is produced:

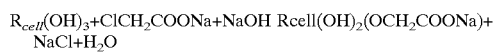

Because three reactive hydroxyl groups are present on each D-glucose-pyranosyl unit, it is possible to introduce three sodium carboxymethyl groups per unit. Such a product would be described as having a degree of substitution of 3. Commercial CMC generally has an average DS of less than 1.5. The derivatized product, having been derived from cellulose with its β-1-4 link preserved is linear in character, and was selected as a structure different from the globular and cross-linked polysaccharides previously described.

A summary of the results is given in Table 8. It is clear that the structural changes can again be achieved using the radiation processing, even in this linear structure, which of course would be more susceptible to radiation induced chain scission effects. The initial mean MW of $1.55 \times 10^5$, with a dose of 1.5 kGy is increased three-fold to $4.44 \times 10^5$. Moreover the polydispersity is improved from 2 to 2.8. This is quite apparent in the differential (FIG. 8a) molar mass distribution, and the increase in $R_g$ from 36 to 52 (see Table 8).

TABLE 8

CMC (7M). % $M_W$ means the mass recovered after injection.
$R_g$ is the RMS-radius and P is the polydispersity (P = $M_W/M_n$).

| File name | $M_{wt}$ | % $M_{wt}$ | $R_g$ nm | P | Mean particles diameter ($\mu$m) | Treatment |
|---|---|---|---|---|---|---|
| CMC-C | $1.55 \times 10^5$ ±0.10 | 100 | 36.4 | 2.0 | None | Control |
| C1-5K | $4.44 \times 10^5$ ± 0.25 | 73 | 51.9 | 1.50 | 215 | 1.5 kGy |
| C1-7K | $3.94 \times 10^5$ ± 0.17 | 82 | 51.7 | 1.8 | 245 | 1.7 kGy |
| C2-3K | $3.57 \times 10^5$ ± 0.15 | 81 | 47.9 | 2.23 | 310 | 2.3 kGy |
| C2-8K | $3.13 \times 10^5$ ± 0.14 | 74 | 46.8 | 2.82 | 434 | 2.8 kGy |
| C3-8K | $2.71 \times 10^5$ ± 0.12 | 64 | 31.3 | 2.39 | 532 | 3.8 kGy |

The changes in viscosity (FIG. 8b) reflect the MW changes, with the now anticipated shear thinning associated with the higher molecular weight product. Gel is formed at the higher doses and is visible in solution. Gelation of CMC solution can be controlled to give stable gels ranging in consistency from soft pourable to very firm. Oscillation measurements are given in FIGS. 8c and d for G' and G" respectively. At a frequency of 0.1 Hz there is a 10-fold increase in G' and G". The method allows controlled increase in molecular weight and gel formation which are increased linearly with the radiation dose as shown in Table 8.

Samples of the modified CMC were subjected to evaluation of its effectiveness in baking applications. The evaluation was extremely positive as shown in the summary of the report based on Farinograph data of three modified samples:

TABLE 9

An independent evaluation of processed CMC.

| Sample | Water absorption % | Dough stability Min. | Dough softening BU |
|---|---|---|---|
| The Company Standard | 62.0 | 6.8 | 60 |
| Unprocessed Control | 67.6 | 7.7 | 65 |
| C1 | 65.7 | 15.5 | 15 |
| C2 | 62.3 | 18.3 | 20 |
| C3 | 68.4 | 12.3 | 30 |

The following explanation will assist in the interpretation of these parameters:

Standard CMC is a 7 MF which is the starting material.

Dough softening is the change in consistency during mixing. The better the dough maintains its consistency, the better, and consequently a good dough stability (measured in minutes) and a low dough softening (measured in BRA-BENDER UNITS (an arbitrary unit) is the target.

The dough stability is the number of minutes the dough maintains the same consistency, the dough softening is the change in consistency after a fixed number of minutes (typically 12 minutes)

Water absorption is the amount of water added in order to obtain a fixed consistency—i.e. if a flour has high water absorption, it requires more water to obtain this fixed consistency than a flour with low water absorption. Addition of hydrocolloids can increase the water absorption, but often it results in lower dough stability and higher dough softening—which is logical as the dough contains more water.

Conclusion: As seen from Table 9, the samples provided showed good water absorption properties, excellent dough stability and resistance to dough softening. This means that a very stable dough with excellent mixing properties and good water absorption can be made using our modified CMC samples C1, C2 and C3.

Pullulan: a Fungal Polysaccharide

Pullulan is a glucan which is extracellularly elaborated by a fungus of the genus Aureobasidium. It is a linear glucan consisting of repeating units of maltotriose joined by α-D-(1-6) linkages. Pullulan hydrolyses produced by pullanase yield about 6.6% maltotetraose, indicating that pullulan contains some maltotetraose units.

Pullulan was selected for the example because it is intermediate between the straight chain CMC and the cross-linked dextran and highly branched globular arabinogalactan proteins. On radiation processing the average MW doubles from $3.17 \times 10^5$ to $6.81 \times 10^5$ and maintains this level to 2.8 kGy; and moreover, there is conversion of the original material to form gel after 3.8 kGy. After a dose 49.8 KGy there is some 30% of the original material converted into gel particles (Table 10).

It is evident that doses and irradiation conditions need to be identified for each system to achieve the optimum results. The initial molecular weight distribution shows two peaks, with one centred on a molar mass of $2.3 \times 10^5$, but moves to $3.5 \times 10^5$. The second high molecular weight peak, initially at $6 \times 10^5$ moves on processing to $1.3 \times 10^6$. The molecular weight distribution broadens (FIG. 9a) and there is a decrease in the original differential weight fractions as the higher molecular weight material is being formed. Measurements of G' (FIG. 9b) shows the enhancement of the rheological properties in manner expected for high molecular weight materials. The dynamic viscosity increase on processing correlates well with the above mentioned Figure.

TABLE 10

Pullulan. % $M_W$ means the mass recovered after injection.
$R_g$ is the RMS radius and P is the polydispersity (P = $M_w/M_n$).

| File name | $M_{wt}$ processed as one peak | % $M_{wt}$ | $R_g$ nm | P | $M_{wt}$ processed as two peaks | % $M_{wt}$ | $R_g$ nm | P | Comments |
|---|---|---|---|---|---|---|---|---|---|
| Pullulan | $3.17 \times 10^5 \pm 0.16$ | 118 | 30.1 | 2.74 | | | | | |
| P1-2A1 | $4.84 \times 10^5 \pm 0.18$ | 105 | 32 | 2.27 | $1.13 \times 10^6 \pm 0.03$ $1.97 \times 10^5 \pm 0.10$ | 32.3 73.9 | 37.7 29.5 | 1.43 1.21 | 1.2 KGy |
| P1-5K | $6.35 \times 10^5 \pm 0.35$ | 110 | 25.1 | 3.26 | $1.46 \times 10^6 \pm 0.08$ $1.65 \times 10^5 \pm 0.09$ | 40.0 71.5 | 34.5 17.9 | 1.89 1.20 | 1.5 KGy |
| P1-7K | $6.81 \times 10^5 \pm 0.41$ | 108 | 25.3 | 3.62 | $1.57 \times 10^6 \pm 0.09$ $1.55 \times 10^5 \pm 0.09$ | 40.3 68.0 | 33.1 19.3 | 2.12 1.19 | 1.7 KGy |
| P2-3K | $6.34 \times 10^5 \pm 0.44$ | 103 | — | 3.60 | $1.51 \times 10^6 \pm 0.10$ $1.54 \times 10^5 \pm 0.10$ | 36.5 67.5 | 36.5 — | 2.07 1.23 | 2.3 KGy |
| P2-8K | $6.60 \times 10^5 \pm 0.45$ | 101 | 21.2 | 3.63 | $1.67 \times 10^6 \pm 0.11$ $1.62 \times 10^5 \pm 0.10$ | 33.5 68.3 | 30.9 14.1 | 2.10 1.23 | 2.8 KGy |
| P3-8 | $5.23 \times 10^5 \pm 0.40$ | 91.5 | — | 3.22 | $1.33 \times 10^6 \pm 0.10$ $1.50 \times 10^5 \pm 0.11$ | 28.8 63.2 | 30.3 — | 1.91 1.24 | 3.8 KGy |
| P5-9A1 | $6.00 \times 10^5 \pm 0.14$ | 91.8 | — | 4.25 | $1.72 \times 10^6 \pm 0.04$ $1.71 \times 10^5 \pm 0.55$ | 26.2 67.9 | 37.3 — | 1.97 1.40 | 5.9 KGy |
| P24-8A1 | $4.03 \times 10^5 \pm 0.12$ | 85.4 | 31.8 | 4.59 | $1.68 \times 10^6 \pm 0.04$ $1.16 \times 10^5 \pm 0.05$ | 15.5 72.5 | 37.7 30.5 | 1.97 1.60 | 24.8 KGy |
| P49-8A1 | $1.77 \times 10^5 \pm 0.12$ | 69.5 | — | 3.43 | $1.48 \times 10^6 \pm 0.10$ $7.62 \times 10^4 \pm 0.58$ | 4.24 63.8 | 32.1 — | 1.97 1.62 | 49.8 KGy |

Hyaluronan and the Hylan Family of Cross-Linked Derivatives

First hyaluronan (HA) was subjected to the radiation processing using up to 3.8 kGy. There is an increase in Mw followed by gel formation in hyaluronan system. FIG. 10a gives the shear viscosity profile for hyaluronan irradiated for various doses. The elastic and flow properties of linear polymeric molecules are attributed to the length of the molecules, the flexibility of the molecular chains and the interactions of the segments of a polymer molecule with other segments of the same and other polymer molecules. From FIG. 10a it can be seen that a dose of 2.0 KGy produced higher molecular weight molecules that resulted in increasing the shear viscosity of HA system, although some gel particles are clearly present. However, upon increasing the radiation dose to 4.0 KGy the high molecular weight hydrogel gel particles increase in size and this can be done in a controlled manner. As a consequence a reduction in shear viscosity was observed. The elastic and viscous response to small oscillatory deformation further confirm the above observation which shows the increase in G' in FIG. 10b.

Hylan is a cross-liked derivative of the linear hyaluronan and increases in intrinsic viscosity can be achieved. The doses used were in the same range (0.828 to 4.435 kGy).

TABLE 11

Intrinsic viscosity and viscosity average molecular weight of hylan after radiation processing.

| Hylan | Intrinsic viscosity (cc/g) | MW(K = 0.397) a = 0.601) |
|---|---|---|
| Zero kGy (Control) | 3926 | 4.4 (× $10^6$) |
| 0.828 | 5062 | 6.8 |
| 2.484 | 4684 | 6.0 |
| 3.6 | 4945 | 6.5 |
| 4.435 | 4712 | 6.0 |

There were no significant new chemical groups introduced by the process, as demonstrated by the fact that infra-red scans were identical for the control and hylan irradiated to 0.5, 1.0 and 2.0 kGy (FIG. 10c). There was no difference either in the ultraviolet spectrophotometric scans of the control and processed hylan samples. Thus no changes had been introduced into the base structure by the radiation processing. When hylan of high initial molecular weight ($6 \times 10^6$) is processed, even after a dose of 1.0 kGy, a hydrogel is produced. The volume and particle diameter of the gel particles are shown in Table 12. The spectrum of particle sizes shows that after 2.0 kGy 755 of the gel particles were greater than 335 μm and 505 were greater than 673 μm. The size of the gel particles, and the quantity produced can be controlled by varying the processing conditions.

TABLE 12

Production of hydrogel after radiation processing of hylan

| Sample No. | 75% particles > ($\mu$m) | 50% particles > ($\mu$m) |
| --- | --- | --- |
| 12/R (Control) | No measurable particles | No measurable particles |
| 0.5 Gy | No measurable particles | No measurable particles |
| 1.0 Gy | 279 | 552 |
| 2.0 Gy | 335 | 673 |

Gelling Polysaccharides: Xanthan, Pectin and Carrageenan

The modifications already demonstrated for other groups of polysaccharides can be applied also to the widest range of commercial polysaccharides, including gellan, welan, guar gum, locust bean gum, algin, starch, heparin, chitin and chitosan. Since another of our objectives is to modify and improve gelation characteristics, the well established polysaccharide gelling agents have been selected to illustrate the universality of the process.

Xanthan

The chemical structure of xanthan comprises a (1→4) linked $\beta$-D-glucan (cellulosic) backbone substituted through position 3 on alternate glucose residues with a charged trisaccharide side chain. Dispersions of this bacterial polysaccharide exhibit weak gel-like behaviour. This structure is disrupted upon shearing. At low shear rates the viscosity is high and the samples show reversible shear-thinning behaviour. Insensitivity to pH, temperature and ionic strength can be achieved by appropriate choice of experimental conditions.

It is a general practice to induce the gelation of xanthan by the addition of divalent and trivalent inorganic ions such as borate ions. With the process here described it is not necessary to add such chemical additives to achieve gelation, and the process can be achieved with "clean" xanthan in a controlled fashion. Not having foreign additives in the system, of course, greatly increases the range of applications possible using the xanthan alone. FIGS. 11 a, b, and c demonstrate how the storage, loss moduli and dynamic viscosity, can be enhanced at will over a 10 to 100 fold range without the addition of any inorganic ions. The proportion of gel to viscous component can be varied as required.

Carrageenan and Alginates

Alginates and carrageenans are the major polysaccharide components of certain species of marine brown and red algae. Both are linear polymers but quite different in primary structure. The carrageenans are based on a disaccharide repeating sequence of alternating 1,3→linked-$\beta$-D-galactose and 1,4-linked $\alpha$-D-galactose, with varying extents and patterns of sulphation. Alginate is a 1,4-linked block co-polymer of $\beta$-D-mannuronate and $\alpha$-L-guluronate. With residues grouped in long, homopolymeric sequences of both types, and in heteropolymeric sequences where the distribution of the two sugars can vary from near random to near alternating. Alginate gives thermally-stable gels with calcium (or larger Group II cations); carrageenan gels melt on heating and reform on cooling. Despite these apparent dissimilarities, however, there are also striking parallels in the way in which the two families of polysaccbarides form gel networks.

Both of these gelling polysaccharides can be modified by the process already described to enable the gelling function to be controlled and enhanced. FIG. 12 shows and example of kappa-carrageenan shear viscosity profile. Thus a new family of these materials can be produced. Carageenan is produced from naturally occurring seaweed. The molecular parameters are therefore determined entirely by this natural process. Weed from some countries can only yield carageenan and alginate with relatively low molecular weights. The process which we herein describe provides a route to overcome such problems with naturally occurring polysaccharide products.

Pectins

Chemically, pectin is a polyuronide, a straight chain of a few hundred $\alpha$-D-galacturonic acid molecules linked by 1,4-glycosidic linkages which are all di-equatorial due to the C1 conformation. In carefully extracted pectins from most plants 70–80% of the galacturonic acid are methyl-esterified. Pectins are not pure poly-uronides: there are 1,2-linked $\alpha$-L-rhamnose molecules interspersed in the galacturonan chain interrupting its conformational regularity by kinks. In carefully extracted pectins from many fruits and vegetables there are 1 to 4 molecules rhamnose and 10 to 15 molecules of arabinose and galactose per 100 molecules of galacturonate. The L-arabinose and D-galactose molecules are covalently bound to rhamnose molecules as complicated side chains. High methoxyl pectins will only gel in the presence of sugars or other co-solutes and at sufficiently low pH, so that the acid groups in the polymer are not completely ionised. Both gel strength and setting temperature are influenced by these factors. In a system with sucrose at around 65% soluble solids, high methoxyl pectins gel up to pH 3.4 (rapid set pectin) or 3.2 (slow set pectin). As the pH is reduced, gel strength and setting temperature will increase up to the point at which the setting temperature approaches the temperature at which the gel is deposited. Below this pH, pectin tends to pre-gel. Control of the gelling function is therefore important. We have utilised orange pectin to demonstrate that the molecular weight and gelation can be controlled as demonstrated by the increase in G' given in FIG. 13. Thus a completely new range of pectin materials can be produced, greatly extending the applicability.

EXAMPLE 3

Protein Systems

Gelatin was selected to demonstrate the applicability of the process to connective tissue proteins as well as carbohydrate systems. This series of materials does not exist in nature and are derived from the parent collagen by processes that destroy the secondary and higher structures with varying degrees of hydrolysis of the polypeptide backbone. The main source is the skin or bones of animals. This protein has a high content of glycine, proline and hydroxy-proline, with a structure which involves glycine—proline-hydroxyproline triplets. Its triple helical structure allows it to form gels on heating and cooling in water. Although at temperatures above 35 to 40° C. gelatins in solution behave as random coils, which can take up an infinite number of transient configurations. On cooling the solution, aggregation occurs and at concentration above about 1% depending on the quality of the gelatin and pH, a clear transparent gel will form. Unlike most protein and polysacharide gels, gelatin gels are thermoreversible, since on warming the gel will dissolve. Using the solid state process described hereinabove, the molecular weight can be increased in a controlled manner to produce a range of products with varying molecular weights and solution/gelling properties (FIGS. 14a, b and c.)

To demonstrate the generality of the phenomenon also with other proteins the same behaviour was enacted with casein in the form of its sodium salt.

EXAMPLE 4

Interactive Blends

A basic technology associated with hydrocolloids is to develop synergistic blends which have a different rheology from the simple additive behaviour of each component, usually a higher viscosity than the sum of the parts.

The process of the present invention enables such synergy to be greatly extended and provides an increased enhancement of viscosity and viscoelasticity compared with separately prepared solution mixes by several orders of magnitude. The co-processing of simple solid state mixtures using the technology developed achieves closer interaction of newly formed higher molecular weight forms of the individual components. The Theological behaviour cannot be reproduced by simply preparing selected mixtures of the parent materials.

Specific examples of these blends are:
Carboxymethyl cellulose—pectin systems (FIG. 15)
Pectin-dextran—systems (FIG. 16)
Carboxymethyl cellulose—dextran (FIG. 17)

The dynamic viscosity, loss and storage modulus of processed blends of these systems can be increased in a controlled manner, and presented for use in a convenience and cost-effective mixture form.

EXAMPLE 5

Adhesion and Bonding

When blends of polysaccharides or polysaccharide-proteins are prepared in a closely interactive state, binding of the components can be achieved. The Theological behaviour of the resulting products can be controlled such that the viscoelasticity is either higher or lower than the corresponding mixtures of the components given the identical processing treatment singly. New product formation incorporating the two components can be produced. It is possible also to interact and similarly co-process mixed systems of natural polysaccharides with water soluble synthetic products.

As illustrative examples of producing the effects identified we cite the following blends produced in the closely interactive state:

(a) when lower composite viscoelasticity can be produced polyvinyl pyrrolidone—dextran (FIG. 18)

The closely interactive blend shows a lower dynamic viscosity (after 10 kGy) than the components processed separately. Polyethylene oxide—arabinogalactan protein interactive blends were used to demonstrate the same behaviour using different types of structural components.

(b) when a higher composite viscoelasticity can be produced polyvinyl pyrrolidone—arabinogalactan protein The closely interactive blend after processing has several orders of magnitude greater viscoelasticity than the equivalent mixture of the components processed singly, when this itself is several orders of magnitude greater than the unprocessed controls (FIG. 19).

(c) when a higher viscoelasticity can be produced using only polysaccharides carboxymethyl cellulose—arabinogalactan protein blends The previously reported enhanced rheology for selected closely interactive blends is repeated (FIG. 20) and the new product formed can be produced such that the proportions of the individual components in the composite can be varied. FIG. (21) illustrates this behaviour using gel permeation/molecular weight distribution behaviour.

(d) when higher or lower viscoelasticity can be obtained according to the selected conditions dextran—pectin According to processing conditions, the final closely interactive state can be used to form a composite with either lower or higher viscoelasticity than the same blend of the individually processed components (FIG. 22), which is itself orders of magnitude greater viscosity than the unprocessed control mixtures.

The new products so produced can be prepared in forms which adhere to cellulosic surfaces to provide enhanced biocomptibility, while retaining complete biodegradability. When prepared on the surface of such systems, the adhesion is greater, with some indication of some form of close bonding.

Uses

The use of closely interactive blends processed in the manner described can produce a range of new composites. Products so produced are different in behaviour from the synergistic blends described in Example 4. These new composite matrices can have either lower or higher viscoelasticity than the conventionally processed mixtures. Thus a new range of products can be developed either as gels, viscous solutions or as membranes. Thus these can be designed for specific applications as medical membranes and pharmaceutical excipients, drug delivery systems and as carriers for the delivery of wound-healing cell signalling macromolecules such as hyaluronan and alginate.

EXAMPLE 6

Enhancing the Biological Function of Demineralized Bone (DMB) in Building New Bone Formation

Background

Human bone, when treated by a process for the differential removal of bone mineral to give "demineralized bone" (DMB), has the capacity to actively induce new bone growth when transplanted into humans (J. N. Kearney and R J. Lomez, Advances in Tissue Banking, 1997, 1, 43–71). Such material has a wide application in oral and maxillofacial surgery, since the osteoinductive capacity of such allogenaic bone allows the transformation of the primitive mesenchymal precursor cells into chondroblasts or osteoblasts, (C. J. Yim, Advances in Tissue Banking, 1999, 3, 87–111). The process of the present invention permits one to transform DMB into a material with greatly enhanced osteoinductive activity, which accelerates and improves the quality of new bone formation.

Materials and Methods

1. Experimental Animals

Ninety healthy male white rats (250–300 g) were used for this experimental study. The animals were divided in the three groups: negative control, control (using DMB), and experimental (using new processed bone—NPB)). The rats were housed (5 rats in each cage) in the standard circumstance of the Experimental Animal Room at the School of Dentistry, Dankook University, Republic of Korea. They were fed a solid diet during the experimental periods. After 2 weeks adaptation periods, the animal experiments were started.

2. Manufacturing of DMB and NPB

Healthy male rats were sacrificed by cervical dislocation in order to obtain the femurs and tibias of each rat. After procuring the bones, they were kept in deep freezer at −70° C.) for 24 hours and thereafter crushed to fine particles using a bone mill. The bones were then processed as follows: The particles were stirred in distilled water 6 times repeatedly every 30 min., demineralized in 0.5N hydrochloric acid for 5 hours, followed by 4 washings in sterile water for 2 hours, soaked in absolute ethanol for 1 hour at room temperature (25° C.), further washed in distilled water, for 3 hours, soaked in diethylether for 30 min and dried in vacuo over night. After these procedures the DMB particles were was divided into various sizes using appropriate sieves. Only 350–600 μm sized DMB particles were used in this study. The DMB was subjected to the gas mediated—radiation processing treatment described above after which they are as designated "New Processed Bone" (NPB). After triple packaging all samples of DMB and NPB were sterilized with 1.5 Mrad γ-radiation.

3. Methods (Surgical Procedures)

1) Anesthesia

Animals were injected preoperatively with Oxytetracycline and then anesthetized with Ketamine Hydrochloride (intramuscularly, 10 mg/kg) and Xylazine Hydrochloride (0.15 ml/kg).

2) Surgery:

In the usual manner, after calvarial flaps were reflected, bone defects were created around the middle calvarium with Ø6 mm trephin-burr and a low-speed dental drill. During formation of defects with the burr, cooling water (sterilized saline) prevented the operating site from overheating. Then the three groups of animals were subjected to the following procedure:

2.1. Negative control group: the wounds were closed without any graft materials
  2.2. Control Group: these were grafted with pure DMB (15 mg/each)
  2.3. Experimental Group: these were grafted with NPB (15 mg/each)
    For all groups closure was performed using 4-0 Vicryl, layer by layer.
    All the above procedures were performed aseptically.

3) Sacrificing the Animals

After surgery five animals from each group were sacrificed within 1, 2 and 3 weeks respectively, and then their defect site (in the calvarium) removed with full thickness flap, including periosteum. The sections of the calvarial were fixed in 10% neutralized formalin.

4. Fabrication of the Specimen

After fixation of the calvarium in 10% neutralized formalin, the bone defects were decalcifying for 3 days with 5% nitric acid. In the usual manner, dehydration and cleaning were performed, after which the calvarium samples were embedded in paraffin. The paraffin sections were stained and examined under a microscope for bone formation.

5. Histologic analysis confirmed the bone formation observations.

6. Measuring the strength of the interbony-union.

Full-thickness of calvarium, including the defect site, were obtained from the animals at each interval and tested for the strength of the inter-bony-union.

The bone specimens were fixed to the holder of a Universal Testing Machine. The rate of compression of testing machine was 5 mm/min. The arm section of the testing machine was round (diameter 1 mm).

CONCLUSION

The processed demineralised bone (NPB) is more effective than the control in creating new bone throughout the healing of the bone, and after three weeks the bone is more than 3 times stronger than is the control. This is a significant advance in enhancing bone growth and should have wide ranging applications in oral and maxillofacial surgery, where demineralized bone is routinely used. The potential applications also include orthopedic use, and offer a new approach to the healing of transplanted bone after trauma or disease. Modification of soft connective tissues can also be accomplished in a similar manner to introduce new and enhanced functional properties.

Representative Uses of the New Product Category Representations

1. Arabinogalactan Proteins

Emulsification of oil in water systems for application as beverages, oils, emulsions, lotions for cosmetic, medical and pharmaceutical use.

New adhesives for paper and related cellulosics.

High molecular weight fibers to enhance bacterial fermentation in the colon for cholesterol and diabetic control.

Gels which can be applied as gelatin replacements, microcapsules, photographic film and as microbiological media and in tissue culture.

Acacia Gels for Excipient, Control Release of Pharmaceutical/Medical Active Agents.

Membranes for delivery of wound healing active agents by greater water binding characteristics.

2 Polysaccharides

A standard range of molecular weight standards for gel permeation and gel electrophoresis.

New range of blood plasma substitutes

Soluble and insoluble polysaccharide systems for immobilization of proteins, enzymes, mammalian cells, cofactors and drugs.

New gels, membranes and films for medically-related applications.

A new generation of polysaccharide fibers for application as food additives and ingredients. The molecular weight control greatly extends the applicability within a whole range of food products, as thickeners, gelling agents, stabilizers, flavor pseudoplasticizer and ingredient encapsulators.

A new carboxymethyl cellulose ingredient for the baking industry, to give better dough stability and excellent resistance to dough softening.

A new generation of materials to thicken water systems, surfactants suspend solids in aqueous media, retard crystal growth, absorb water from the atmosphere form films, and as plastics additives and packaging.

A range of membranes for chromatography with varying charge, chiral and ligand interactive properties.

A new range of pourable gels, improving gelatin characteristics.

Industrial applications as metal chelating polysaccharides for applications ranging from waste water treatment to precious metal recovery and metal chilate chromatography.

3. Protein—Polysaccharide Systems

Application of the new material products as wound dressings, adhesive pads for surgical use, hemostatic agents, blood intradermal augmentation, controlled release drug delivery systems for topical and oral administration.

All existing applications of biocompatible hydrogels can be extended using the process modified materials and the new adhesion discovery for such applications as coatings for medically related polymer equipment, vascular grafts and sue such as for contact lenses, artificial corneas, soft tissue augmentation, etc.

4. Tissue Modification

Tissues derived from human and animal origin, such as bone, skin, tendon, cartilage can be endowed with greatly improved physical and biological performance when used as grafts or transplants. Demineralized bone can be endowed with up to four times greater bone healing characteristics after the processing described. Such bone has extensive applications in orthopedic, oral and maxillofacial surgery to promote new bone growth after bone loss through trauma or disease.

Variations and modifications can, of course, be made without departing from the spirit and scope of the invention:

Having thus described our invention what we desire to secure by Letters Patent and hereby claim is:

1. A process for modifying a naturally occurring biocompatible biopolymer, said biopolymer being a polysacchiaride; the process comprising subjecting said biopolymer, in the solid, or dry state, to a source of ionizing radiation in the presence of a mediating gas which is an unsubstituted alkynic gas and annealing the resulting product in the absence of oxygen at a temperature of about 40 to 120° C., and thereafter removing any residual mediating gas.

2. A process according to claim 1 wherein the source of the ionizing radiation is a γ-ray emitting radioactive isotope, X-rays or high energy radiation generated by an electron accelerator.

3. A process according to claim 2 wherein the dose of ionizing radiation to which the biopolymer is subjected to is from about 1 to 50 kGy.

4. A process according to claim 2 wherein the radioactive isotope is $^{60}$Co.

5. A process according to claim 2 wherein the radiation is generated by an electron generator of 250 KeV to 10 MeV capacity.

6. A process according to claim 1 wherein the unsubstituted alkynic gas is acetylene.

7. A process according to claim 1 wherein annealing is effected in the presence of the mediating gas, an inert gas or in vacuo.

8. A process according to claim 7 wherein the inert gas is nitrogen or helium.

9. A process according to claim 1 wherein removal of any residual mediating gas is effected by aerating the system and optionally, additionally applying vacuum.

10. A process according to claim 1 wherein the polysaccharide is of micro-organism, plant or animal origin.

11. A process according to claim 10 wherein the biopolymer is a polysaccharide of plant origin.

12. A process according to claim 11 wherein the polysaccharide is dextran pullulan xanthan, carageenan or pectin.

13. A process according to claim 10 wherein the biopolymer is a polysaccharide of animal origin.

14. A process according to claim 13 wherein the polysaccharide is hyaluronan, or a proteoglycan.

15. A process according to claim 1 wherein the biopolymer to be modified is characterized by the absence of any functionalizing groups.

16. A process according to claim 1 wherein the modified biopolymer retains the same degree of biocompatibility as the starting material.

17. A process according to claim 1 wherein the modifications to the treated biopolymer include (a) increasing the molecular weight to endow the biopolymer with increased emulsifiability and water binding ability, (b) endowing the biopolymer, when in aqueous solution, with the ability to achieve a desired degree of viscosity or viscoelasticity; and (c) enabling the biopolymer to be converted into hydrophilic gels of predetermined size and micromechanical properties.

18. A process according to claim 1 wherein the biopolymer to be modified is carboxymethyl cellulose ("CMC"), a mixture of CMC and dextran or a mixture of CMC and pectin.

19. A process as claimed in claim 1 wherein the process is conducted at atmospheric pressure.

20. A process for modifying a naturally occurring biocompatible biopolymer selected from the group consisting of polysaccharides of microorganism, plant or animal origin, a protein of animal connective tissue origin, a protein of other animal tissue origin, a combination of at least one of said polysaccharides and at least one other protein of plant origin and demineralized bone, said process comprising subjecting said biopolymer in the solid or dry state, to a source of ionizing radiation in the presence of a mediating gas which is an unsubstituted alkynic gas and annealing the resulting product in the absence of oxygen at a temperature of about 40° to 120°, and thereafter removing any residual mediating gas.

21. A process according to claim 20 wherein the source of the ionizing radiation is a γ ray emitting radioactive isotope, X-rays or high energy radiation generated by an electron accelerator.

22. A process according to claim 21 wherein the dose of ionizing radiation to which the biopolymer is subjected to is from about 1 to 50 kGy.

23. A process according to claim 21 wherein the radioactive isotope is $^{60}$ Co.

24. A process according to claim 21 wherein the radiation is generated by an electron generator of 250 KeV to 10 MeV capacity.

25. A process according to claim 20 wherein the unsubstituted alkynic gas is acetylene.

26. A process according to claim 20 wherein annealing is effected in the presence of the mediating gas, an inert gas or in vacuo.

27. A process according to claim 26 wherein the inert gas is nitrogen or helium.

28. A process according to claim 20 wherein removal of any residual mediating gas is effected by aerating the system and optionally, additionally applying vacuum.

29. A process according to claim 20 wherein the biopolymer is a polysaccharide of plant origin.

30. A process according to claim 29 wherein the polysaccharide is dextran, xanthan, carageenan or pectin.

31. A process according to claim 29 wherein the biopolymer is a polysaccharide of animal origin.

32. A process according to claim 29 wherein the polysaccharide is hyaluronan, or a proteoglycan.

33. A process according to claim 20 wherein the biopolymer is a protein of plant origin.

34. A process according to claim 33 wherein the protein is an arabinogalactan.

35. A process according to claim 34 wherein the arabinogalactan is an acacia plant exudate.

36. A process according to claim 20 the biopolymer is a protein of animal connective, or other tissue origin.

37. A process according to claim 36 wherein the protein is of connective tissue origin and is collagen or gelatin.

38. A process according to claim 36 wherein the protein is casein.

39. A process according to claim 20 wherein the biopolymer is a combination of at least one said polysaccharide and one said protein.

40. A process according to claim 20 wherein the biopolymer is demineralized bone.

41. A process according to claim 20 wherein the biopolymer to be modified is characterized by the absence of any functionalizing groups.

42. A process according to claim 20 wherein the modified biopolymer retains the same degree of biocompatibility as the starting material.

43. A process according to claim 20 wherein the modifications to the treated biopolymer include (a) increasing the molecular weight to endow the biopolymer with increased emulsifiability and water binding ability; (b) endowing the biopolymer, when in aqueous solution, with the ability to achieve a desired degree of viscosity or viscoelasticity; and (c) enabling the biopolymer to be converted into hydrophilic gels of predetermined size and micromechanical properties.

44. A process according to claim 20 wherein the biopolymer to be modified is carboxymethyl cellulose ("CMC"), a mixture of CMC and dextran or a mixture of CMC and pectin.

45. A process according to claim 20 wherein the biopolymer to be modified further includes polyvinyl pyrrolidone ("PVP").

46. A process according to claim 45 the biopolymer is a mixture of PVP and dextran or an arabinogalactan.

47. A process according to claim 20 wherein the process is conducted at atmospheric pressure.

48. A process for modifying a tissue of animal origin, said process comprising subjecting said tissue sample or a component thereof in the solid, or dry state, to a source of ionizing radiation in the presence of a mediating gas which is an unsubstituted alkynic gas and annealing the resulting product in the absence of oxygen at a temperature of about 40° to 120° C., and thereafter removing any residual mediating gas.

49. A process according to claim 48 wherein the tissue is bone and the ionizing radiation is a $\gamma$-ray emitting radioactive isotope, X-rays or high energy radiation generated by an electron accelerator.

50. A process according to claim 49 wherein the bone is whole bone or demineralized bone.

51. A process according to claim 50 wherein the tissue is soft tissue.

52. A process as claimed in claim 11 wherein the polysaccharide is an acacia exudate gum.

53. A process as claimed in claim 27 wherein the polysaccharide is an acacia exudate gum.

* * * * *